US012623178B2

(12) United States Patent
De Lacquet Rocha E Silva

(10) Patent No.: US 12,623,178 B2
(45) Date of Patent: May 12, 2026

(54) TEMPERATURE-BASED MONITOR AND CONTROL OF A COMPRESSED-GAS DRYER

(71) Applicant: Atlas Copco Airpower, Naamloze Vennootschap, Wilrijk (BE)

(72) Inventor: Frederico Jose De Lacquet Rocha E Silva, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 319 days.

(21) Appl. No.: 18/303,939

(22) Filed: Apr. 20, 2023

(65) Prior Publication Data

US 2023/0338887 A1 Oct. 26, 2023

Related U.S. Application Data

(60) Provisional application No. 63/333,284, filed on Apr. 21, 2022.

(51) Int. Cl.
*B01D 53/06* (2006.01)
*B01D 53/26* (2006.01)
(Continued)

(52) U.S. Cl.
CPC ........... *B01D 53/06* (2013.01); *B01D 53/261* (2013.01); *B01D 53/30* (2013.01); *F24F 3/1423* (2013.01);
(Continued)

(58) Field of Classification Search
CPC ...... B01D 53/06; B01D 53/04; B01D 53/261; B01D 53/30; B01D 2257/80;
(Continued)

(56) References Cited

U.S. PATENT DOCUMENTS 4,926,618 A * 5/1990 Ratliff ................... F24F 3/1423
96/111
5,688,305 A 11/1997 Graeff
(Continued)

FOREIGN PATENT DOCUMENTS

BE 1027507 A1 * 3/2021 ............. B01D 53/26
CN 212492277 U 2/2021
(Continued)

OTHER PUBLICATIONS

Australian Search Report from corresponding AU Application No. 2023255455, Sep. 9, 2025.
(Continued)

*Primary Examiner* — Frank M Lawrence, Jr.
(74) *Attorney, Agent, or Firm* — Workman Nydegger

(57) ABSTRACT

Methods, systems, and apparatuses are provided for determining a rotational status of a rotor of a compressed-gas dryer system. The compressed-gas dryer system a compressed gas inlet configured to receive a compressed gas to be dried from a compressed gas source; a regeneration gas inlet configured to receive a regeneration gas from a regeneration gas source; a pressure vessel defining a drying zone and a regeneration zone; a driver configured to drive rotation of a rotor provided in the pressure vessel in a predetermined rotational direction; at least a first temperature sensor configured to obtain first temperature data indicative of a first temperature at a first position within the pressure vessel; and a controller configured to receive the first temperature data and based thereon, determine a rotational status of the rotor.

22 Claims, 11 Drawing Sheets

(51) Int. Cl.
    *B01D 53/30*       (2006.01)
    *F24F 3/14*       (2006.01)

(52) U.S. Cl.
    CPC .................... *B01D 2257/80* (2013.01); *B01D 2259/40083* (2013.01)

(58) Field of Classification Search
    CPC .......... B01D 2259/40083; B01D 2259/40009; B01D 2259/4009; B01D 2259/4591; F04B 2205/11; F04B 49/065; F04B 39/16; F24F 3/1423; F24F 2203/1032
    USPC ...... 95/14, 113, 117, 121, 123, 126; 96/112, 96/125, 130, 150; 34/80, 472, 473
    See application file for complete search history.

(56) References Cited

U.S. PATENT DOCUMENTS

| | | | | |
|---|---|---|---|---|
| 6,447,583 | B1 | 9/2002 | Thelen et al. | |
| 6,527,836 | B1* | 3/2003 | White, Jr. | B01D 53/261 |
| | | | | 96/113 |
| 10,632,416 | B2 | 4/2020 | Friesen et al. | |
| 2012/0132070 | A1* | 5/2012 | Matsuba | B01D 53/06 |
| | | | | 96/110 |
| 2014/0027086 | A1* | 1/2014 | Kim | F24F 11/46 |
| | | | | 165/6 |
| 2014/0250930 | A1* | 9/2014 | Unezaki | B01D 53/261 |
| | | | | 62/271 |

FOREIGN PATENT DOCUMENTS

| | | | |
|---|---|---|---|
| CN | 212492278 | U | 2/2021 |
| JP | H10314540 | A | 12/1998 |
| JP | 2000157831 | A | 6/2000 |
| JP | 2006175390 | A | 7/2006 |
| JP | 2010099652 | A | 5/2010 |
| JP | 2020131106 | A | 8/2020 |
| JP | 2020180720 | A | 11/2020 |
| JP | 7053079 | B1 | 4/2022 |
| WO | 2013012043 | A1 | 1/2013 |
| WO | 2015039193 | A2 | 3/2015 |
| WO | 2020092272 | A1 | 5/2020 |
| WO | 2021033101 | A1 | 2/2021 |

OTHER PUBLICATIONS

Japanese Office Action from corresponding JP Application No. 2024-562098, Oct. 31, 2025.
Belgian Search Report from corresponding BE Application No. 202205331, Dec. 13, 2022.
International Preliminary Report on Patentability from corresponding PCT Application No. PCT/IB2023/054045, Sep. 23, 2024.
International Search Report from corresponding PCT Application No. PCT/IB2023/054045, Aug. 1, 2023.
Chinese Office Action from Corresponding Chinese Patent Application No. CN202210965039.1, Dec. 26, 2025.

* cited by examiner

TEMPERATURE-BASED MONITOR AND CONTROL OF A COMPRESSED-GAS DRYER

FIELD OF THE DISCLOSURE

The present disclosure relates to methods, systems, and apparatuses for monitoring and controlling a compressed-gas dryer, and particularly for monitoring, controlling, and optimizing the efficiency of a rotary drum dryer of a compressed-gas system based particularly on temperature information within the compressed-gas system.

BACKGROUND

Dry compressed air is used in a wide range of applications including, but not limited to, food processing, chemical and pharmaceutical operations, pneumatic tools, HVAC and HVAC control systems, abrasive blasting, injection molding, airbrushing, and manufacturing, for example, the manufacture of electronic componentry. In the food industry, dry air is used to dehydrate grains, dairy products, vegetables and cereals. In the electronics industry, dry compressed air is used, for example, to remove demineralized water and cleaning solvents from silicon devices and circuit boards.

Atmospheric air contains water vapor, and this water vapor must be taken into consideration when producing compressed air. For example, a compressor with a working pressure of 7 bar and a capacity of 200 liters/second that compresses air at 20° C. with a relative humidity of 80% will release 10 liters/hour of water into the compressed air line.

Water and moisture in a compressed air system can cause erosion, corrosion, and biological effects which can result in product spoilage, equipment malfunction and system failure. For example, in a compressed air line, water is fluidized to an aerosol mist by the turbulent air flow and the droplets are propelled at high velocities until they impact on obstructions in their path, such as piping elbows, valve discs, orifice plates, or air motor blades. The resulting repeated impacts produce pitting. Further, the produced pits caused by the high-velocity water aerosol mist provide havens for salt ions and acids, which further corrode the surface by chemical action. The weakened surface is then prone to stress corrosion by mechanical vibration and flexing. Erosion can be controlled by eliminating liquid aerosols and particles in air and removing water vapor, which can condense and form liquid droplets, from compressed air systems. Thus, in installations where compressed air lines are exposed to low temperatures and are prone to condensation, it is important that the air be dried to a dew point below the lowest possible temperature.

In addition to erosion, moisture in compressed air systems can cause corrosion and destructive biological effects. Water and oil vapors can be removed by adsorption processes. Liquid aerosols may be removed from the air stream by such means as coalescing filters. Wet corrosion in compressed air systems is particularly aggressive because of the absorption of corrosive agents from the air. Although pure liquid water is not itself corrosive, very corrosive solutions are formed when water is combined with salt particles or acidic gases. It is known that corrosion can be controlled by drying the air to its lowest possible dew point.

Further, moisture in compressed air systems is harmful because moist air permits the growth of bacteria, fungus and mold, which produce acidic waste that also fosters corrosion of compressed air systems. Microorganisms may also accumulate in instrumentation tubing and air motor bearings, resulting in malfunction, excessive wear rates, and seizure.

Thus, it is advantageous for controlling harmful biological effects, to dry the air to a dew point which reduces the relative humidity to below 10%.

Additionally, moisture in compressed air can cause product contamination by both direct and indirect means. Both water droplets and water vapor can be absorbed by the product in direct contact processes, such as, by way of example, in chemical mixing, and paint spraying applications. The absorption of water can adversely affect the chemical and physical properties of the product.

In applications of dry compressed air, such as in manufacturing, a −40° F. to −100° F. dew point air is often used and therefore, it is advantageous to utilize a drying process in which the air is dried to its lowest possible dew point. For example, compressed air used in analytical instrumentation must be extremely pure and contain minimal levels of water vapor. Infrared analyzers and gas chromatographs used to analyze air for environmental chamber and physiological respiration testing typically require stable quality air and dew point levels below −60° F. Such high purity air, called "zero air," is also beneficial in prolonging the life of sensitive components, in preventing contamination of the test samples and in preventing undesirable side reactions during analyses.

The degree of dryness required is generally determined by an analysis of each individual compressed air system and the air-drying system should be designed to reduce the water vapor content to the lowest dew point level.

There are known compressed gas dryer systems, such as rotary drum dryers, which are provided with a pressure vessel containing a drying zone and a regeneration zone. Such systems also often include a cooling zone. A rotatable drum is provided in the pressure vessel with a regenerable desiccant.

The pressure vessel includes an inlet for the supply of compressed gas to be dried to the drying zone and an outlet for the discharge of dried gas. A warm regeneration gas is supplied to the regeneration zone for regeneration of the desiccant. The dryer further includes a driver that rotates the drum such that the drying agent is successively moved through the drying zone and the regeneration zone (and cooling zone, as applicable).

Removal of moisture from an air feed stream can be considered to depend upon several factors including the rate of flow of the gas streams, the rate of moisture adsorption and moisture content of the adsorbent, as well as the temperature and pressure of the air within the bed.

Known methods have been provided for accurately predicting the contamination level of the gas stream exiting the adsorption sector and optimizing the performance and fractionation efficiency of the rotating drum adsorber system, such as those described by U.S. Pat. No. 6,527,836. Such methods, as described for example, in U.S. Pat. No. 6,527, 836, include providing a complex proposed set of drum dryer design and operational parameters and initial operating conditions, calculating predicted dew points at such conditions, determining temperature information from the regeneration and cooling sectors, and displaying the sector temperature profiles and discharge temperatures at predicted dew points for evaluation by an engineer for providing optimum performance of the system and achieving a lowest effluent dew point. Such known methods include determining the average or mixed concentration discharging over the entire surface in the adsorption sector and the mixed stream discharge temperature exiting the cooling sector. The average or mixed discharge concentrations in the adsorption sector are determined using classical adsorption equations:

$$J_o = 0.5\left[1 - \text{erf}\left\{(N)^{1/2} - (NT)^{1/2}\right\}\right] \text{(Nearly linear isotherm)} \quad (1)$$

$$J_o = 0.5\left[1 - \text{erf}\left\{(N)^{1/2} - (NT)^{1/2}\right\}\right] \text{(Nearly constant isotherm)} \quad (2)$$

$$\text{where } J_o = c_1/c_o \quad (3)$$

$$N = L/H_d \quad (4)$$

$$T = (c_o - c_1)(u_o\tau - V\epsilon)/[(n - n_i)\rho_a L A_x] \quad (5)$$

$c_1$: effluent contaminant concentration
$c_0$: influent contaminant concentration
N: Number of mass transfer units, dimensionless
T: Material balance ratio, solute adsorbed per adsorbent capacity
L: Adsorbent bed length
$H_d$: Mass Transfer Unit Height
$u_o$: Mass flow rate in adsorption sector
$\tau$: time in adsorption sector
V: Adsorbent bed volume in adsorption sector
$\epsilon$: Adsorbent bed void fraction
n: Adsorbent bed equilibrium capacity per unit weight
$n_i$: Initial concentration in adsorbent bed
$\rho_a$: Adsorbent bed density
$A_x$: Adsorption section cross sectional surface area In such known methods, Equation (1) above is used with adsorbents characterized by nearly linear isotherms, such as, by way of provided example, silica gel and activated alumina. Equation (2) above is used with adsorbents characterized by nearly constant isotherms, such as, by way of provided example, molecular sieves, or zeolites and activated titanium dioxide. In the cooling sector, Equation (1) is used to determine the temperature profile and the integration of this equation provides the mixed stream discharge temperature and the terms in Equation (1) are defined in terms of heat transfer:

$$J_o = (t - t_o)/(t_1 - t_o) \quad (6)$$

$$N = L/H \quad (7)$$

$$T = c_p(\tau_c u_c - V\epsilon)/(c_{pa}\rho_a L A_x) \quad (8)$$

t: discharge temperature
$t_0$: initial bed temperature
$t_1$: air inlet temperature
H: Heat Transfer Unit Height
$c_p$: heat capacity of gas
$\tau_c$: time in cooling sector
$u_c$: mass flow rate through cooling sector
V: Adsorbent bed volume in cooling sector
$c_{pa}$: heat capacity of adsorbent In these methods, the time in the cooling sector, $\tau c$, is equal to $(\varphi c/2\pi)/rpm$ where pc is the cooling sector angle in radians.

In the known methods, in the regeneration sector, prior to entering the cooling sector, two thermal fronts are considered to be established. The first thermal front approaches the equilibrium temperature where desorption occurs, and the second, lagging front approaches the elevated inlet temperature. The known methods, such as U.S. Pat. No. 6,527,836, illustrate the two thermal fronts and the time period for which the regeneration sector is at the equilibrium temperature in a graphical display of the regeneration temperature versus the time. This graph shows a double humped temperature curve which may be used to analyze the performance of the rotating drum adsorber system. After the first hump, there is a period when the temperature in the regeneration sector remains constant showing the equilibrium temperature. According to U.S. Pat. No. 6,527,836, as long as some moisture remains in the regeneration sector, this temperature is constant. When the second hump begins, a given flute of the adsorbent drum is considered regenerated. The known methods, such as of U.S. Pat. No. 6,527,836, allow a user to adjust various inlet conditions, such as inlet temperature, system pressure, flow rate, regeneration inlet temperature, regeneration flow rate and/or rotational speed of the drum, and easily generate regeneration temperature versus time graphs, at various conditions, to show rotating drum adsorber system performance changes in response to such adjustments.

In addition, using a computerized method, a user may generate various graphical displays of data such as, by way of example, Cooling Temperature vs. Time, Cooling Temperature vs. Flute Length, Dew Point vs. Inlet Temperature, Dew Point vs. Regeneration Temperature, Dew Point vs. Regeneration Flow Rate, Dew Point vs. Motor Rotational Speed and Dew Point vs. Flow Rate, for controlling the operational conditions of the rotating drum adsorber system to improve its performance and achieve lowest effluent dew point.

Further, the known methods for accurately predicting the contamination level of the gas stream exiting the adsorption sector and optimizing the performance and fractionation efficiency of the rotating drum adsorber system, such as those described by U.S. Pat. No. 6,527,836, provide a means for displaying the sector temperature profiles and discharge temperatures, as well as other system conditions, for evaluation for improving the design of the rotating drum adsorber system and achieving optimum performance. In these known methods, such as those described by U.S. Pat. No. 6,527,836, the process steps and equations and calculations of a computerized method are embodied in a unique computer program to provide in-depth knowledge of the system for accurately predicting the performance and controlling the operations of a rotating drum adsorber process and system based upon a proposed set of system parameters, initial operating conditions, varied operating characteristics and performance levels of different sized rotating drums, and other variations of the system design parameters under any number of different operating conditions. The computer program is specifically designed for quickly and easily generating graphical displays, of the sector temperature profiles and discharge temperatures and other system data for evaluation to attain maximum system performance and an optimized product.

Such known systems provide for the inputting of information, including: main flow (SCFM), inlet temperature (° F.), regeneration temperature (° F.), system pressure (psig), regeneration flow (SCFM), inlet relative humidity, drive motor speed (rpm) and blower flow rate (SCFM). In addition, the computer program used in such methods provides for the selection of a rotating drum system model. The selection of the drum model number determines the diameter and length of the adsorbent drum. For example, the diameter and length of different models may be 14.5 inches and 200 mm, 14.5 inches and 400 mm, 18.5 inches and 400 mm, or 24.5 inches and 400 mm. Further, the computer program used in these methods provides for the selection of a specific manufacturer of the adsorbent drum. The preferred computer program of the known methods includes the choices of Nichias (silica gel or GX7 models) and Siebu Giken (silica gel or molecular sieve). With the selection of the model number, specific information about the physical properties of the rotating drum can be obtained, including the height and width of the flute triangle, the thickness of the media holding the silica, the approximate seal width, the angle of the adsorption sector, and the angle of the regeneration sector.

Using the input information including the initial operating conditions and drum design parameters, the computer program of the known methods, such as that described by U.S. Pat. No. 6,527,836, then calculate various information relating to product flow, the regeneration sector and the cooling sector. For product flow, the program may determine the predicted outlet pressure dew point (° F.) and outlet temperature (° F.). In the regeneration sector, the computer program may determine the equilibrium temperature (° F.), final flute outlet temperature (° F.), average outlet temperature (° F.) and flow rate (SCFM). In the cooling sector, the computer program may determine the final flute outlet temperature (° F.), average outlet temperature (° F.) and flow rate (SCFM). In addition, the computer program provides condenser inlet temperature (° F.), useful capacity [#H20/100 #Dscc] and water loading [#H20]. Thus, the computer program used in these known methods provides a system information and graphical displays, as needed or desired to evaluate the performance of and/or to control the rotating drum adsorber process and system to attain maximum performance and an optimized product.

Further, graphical displays of information which may be provided by the computerized method are generated using the following main initial operating conditions and system parameters: main flow=450 SCFM; inlet temperature=100° F.; regeneration temperature=300° F.; system pressure=100 psig; regeneration flow=200 SCFM; blower head=30 WC and the rotating drum=RDD450 model. In addition, the following conditions are also included: inlet relative humidity=85%; drive motor speed=1.2 RPM; blower temperature=100° F. . . . ; and blower flow rate=225 SCFM. The initial operation conditions and system parameters provided herein are for example purposes only and may be varied, as appropriate, by the user of the computerized method.

Using this input information, the computer program of the known methods, such as that described by U.S. Pat. No. 6,527,836, calculates a pressure outlet dew point of the product flow of 1.3° F. and an outlet temperature of the product flow of 125.3° F. The computer program determines the following information relating to the regeneration sector 40: the equilibrium temperature is 156.9° F., the final flute outlet temperature is 299.2° F., the average outlet temperature is 166.7° F. and the flow rate is 200 SCFM. In the cooling sector 42, the computer program calculates the final flute outlet temperature of 127.5° F., average outlet temperature of 264.3° F. and a flow rate of 28.5 SCFM. In addition, the computer program determines that the condenser inlet temperature is 178.9° F., Useful capacity [#H20/100 #Dscc] is 9.4 and the water loading [#H20] is 0.53.

While known methods, such as those described by U.S. Pat. No. 6,527,836, are described as accurately predicting the contamination level of the gas stream exiting the adsorption sector and optimizing the performance and fractionation efficiency of the rotating drum adsorber system, such methods and systems are overly complex, requiring significant computational capacity and time delay due to such computations.

Therefore, the inventor of the present disclosure has identified a need for an efficient, reliable adsorption process and system for increasing the purity of an air feed stream and achieving the lowest effluent dew point, and a simpler method for designing, monitoring, and controlling such an adsorption process and system. Additionally, while reducing moisture content in a compressed-air system is required, as noted above, there is a need to do so in an efficient manner, balancing the need to provide a drying process in which the air is dried to its lowest possible dew point while at the same time reducing energy consumption in the process and unnecessary wear on the air-drying system.

It has been found by the inventor of the present application that the known calculations and optimizations are indeed unnecessary and inefficient, require more time and processing capacity than is necessary, and the inventor of the present application has found a robust and efficient method and system to accurately predict contamination levels of the gas stream exiting the absorption sector while controlling and optimizing performance efficiency of the rotating drum absorber system using limited temperature-based parameters.

Lastly, for rotary drum dryer systems, it is critical to guarantee that the drum is rotating properly, including rotating and rotating in the correct direction. A stop of the rotor or a rotation in the incorrect direction, for example, a rotation of the drum in a clockwise direction while the system is configured for rotation of the drum in the counterclockwise direction, can cause serious damage to the components if such stoppage or wrong movement is not quickly detected and addressed. Currently, sensors are used within the motor to continuously monitor the rotation and direction of rotation of the drum. But these sensors occupy a significant amount of space in the current cubicles and pin connectors, and the known sensors fail to give correct feedback in case of a failure in the mechanical connection between the rotor and the motor (pins).

The robust and efficient method and system disclosed herein also provides for an accurate and quicker monitoring and detection of the rotation of the rotating drum using the limited temperature-based parameters, at lower costs.

SUMMARY

A compressed-gas dryer system is provided that comprises a compressed gas source providing a compressed gas to be dried; a regeneration gas source providing a regeneration gas; a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone; a driver configured to drive rotation of a rotor provided in the pressure vessel in a predetermined rotational direction; a first temperature sensor configured to obtain first temperature data indicative of a first temperature at a first position within the pressure vessel, and a second temperature sensor configured to obtain second temperature data indicative of a second temperature at a second position within the pressure vessel; and a controller configured to receive the first temperature data and second temperature data and based thereon, determine a rotational status of the rotor.

A temperature-based method for determining a rotational status of a rotor of a compressed-gas dryer system is provided. The compressed-gas system includes a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction. The method comprises receiving first temperature data of a first signal obtained by a first temperature sensor, the first temperature data being indicative of a first temperature at a first position within the pressure vessel; receiving second temperature data of a second signal obtained by a second temperature sensor, the second temperature data being indicative of a second temperature at a second position within the pressure vessel; and determining, by a controller, the rotational status of the rotor based on the first temperature data obtained from the first temperature sensor the second temperature data obtained from the second temperatures sensor.

A hardware storage device or a memory storage having stored thereon computer executable instructions which, when executed by one or more processors of a computing system, configure the computing system to receive first temperature data of a first signal obtained by a first temperature sensor, the first temperature data being indicative of a first temperature at a first position within the pressure vessel; receive second temperature data of a second signal obtained by a second temperature sensor, the second temperature data being indicative of a second temperature at a second position within the pressure vessel; and determine a rotational status of the rotor of a compressed-gas dryer system based on the first temperature data obtained from the first temperature sensor the second temperature data obtained from the second temperature sensor.

A compressed-gas dryer system is provided that comprises a compressed gas source providing a compressed gas to be dried; a regeneration gas source providing a regeneration gas; a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone; a driver configured to drive rotation of a rotor provided in the pressure vessel in a predetermined rotational direction; a first temperature sensor configured to obtain first temperature data indicative of a first temperature at a first position within the pressure vessel; and a controller configured to receive the first temperature data and second temperature data and based thereon, determine a rotational status of the rotor.

A temperature-based method for determining a rotational status of a rotor of a compressed-gas dryer system is provided. The compressed-gas system includes a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction. The method comprises receiving first temperature data of a first signal obtained by a first temperature sensor, the first temperature data being indicative of a first temperature at a first position within the pressure vessel; and determining, by a controller, the rotational status of the rotor based on the first temperature data obtained from the first temperature sensor.

A hardware storage device or a memory storage having stored thereon computer executable instructions which, when executed by one or more processors of a computing system, configure the computing system to receive first temperature data of a first signal obtained by a first temperature sensor, the first temperature data being indicative of a first temperature at a first position within the pressure vessel; and determine a rotational status of a rotor of a compressed-gas dryer system based on the first temperature data obtained from the first temperature sensor.

Figure 1:
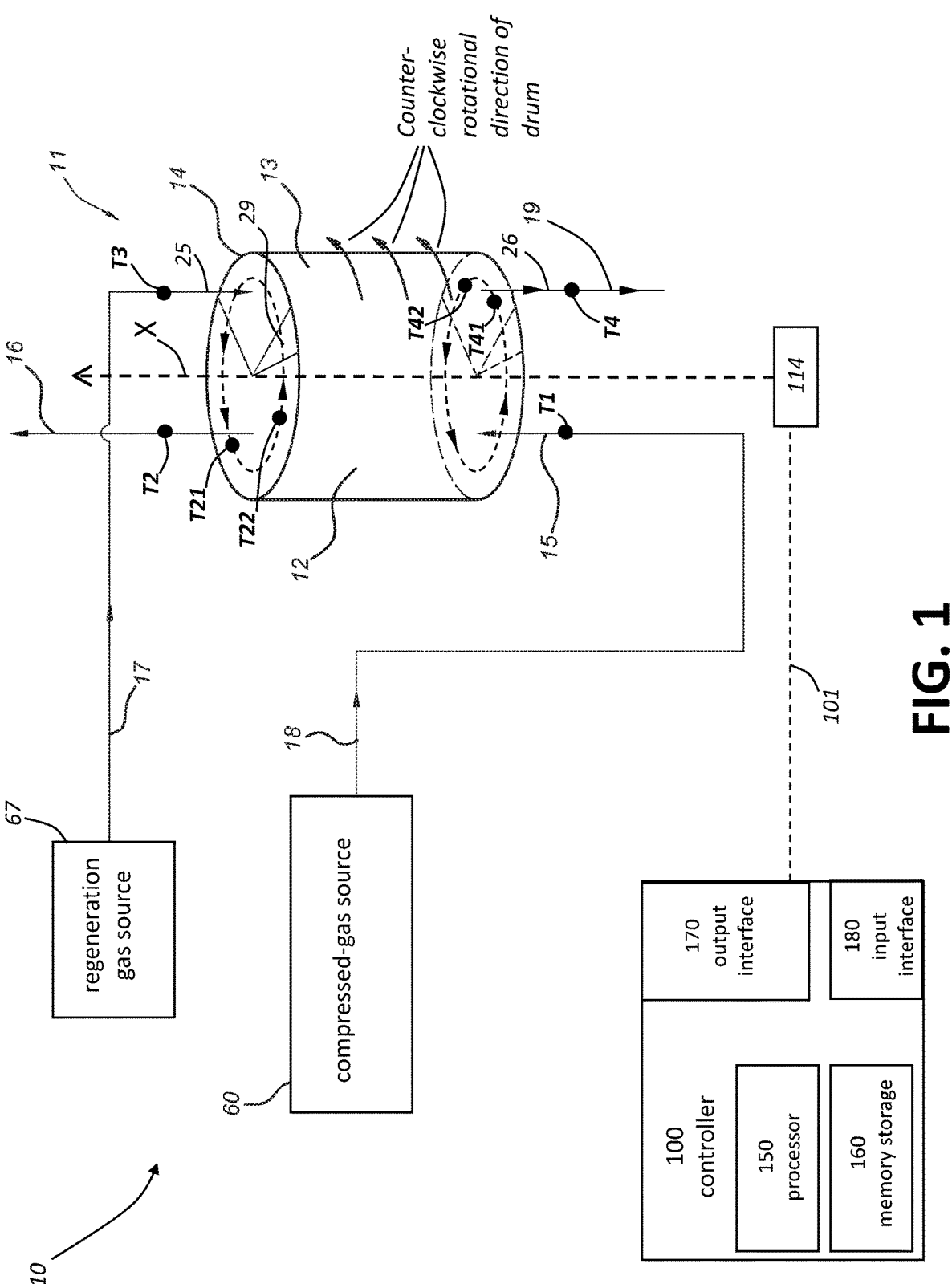
FIG. 1 shows a first embodiment of a compressor installation comprising a dryer system.

The drawings are included to provide a better understanding of the components and are not intended to be limiting in scope, but to provide exemplary illustrations.

DETAILED DESCRIPTION OF VARIOUS EMBODIMENTS

The inventive concepts of the present disclosure will be described below with reference to embodiments and with reference to the drawings. But the claimed invention is not limited thereto. The drawings described are only schematic and are non-limiting in scope. In the drawings, the size of some of the elements may be exaggerated and not drawn on scale; this is for ease of illustration. The dimensions and relative dimensions do not necessarily correspond to practical embodiments of the invention.

Furthermore, the terms first, second, third and the like may be used for distinguishing between similar elements and not necessarily for describing a sequential or chronological order. The terms are interchangeable under appropriate circumstances and the embodiments of the invention can be practiced in sequences other than those described or illustrated herein.

The terms "topmost," "upper," "bottommost," "lower," "above," "below," and the like in the description and in the claims are also used for purposes of example and are not necessarily used to describe relative positions. These terms are interchangeable under appropriate circumstances and the embodiments of the invention described herein can be practiced in other orientations than described or illustrated herein.

In addition, the various embodiments which may be described as "preferred embodiments" are to be construed as merely illustrative of ways and modes for carrying out the invention and not as limitations on the scope of the invention.

The terms "comprising", "including", or "having" as used in the claims should not be interpreted as being limited to the means or steps mentioned thereafter. The terms are to be interpreted as specifying the presence of the stated features, elements, steps or components as referred to, but do not preclude the presence or addition of one or more other features, elements, steps or components, or groups thereof. Thus, the scope of the expression "an apparatus or device comprising means A and B" should not be taken as being limited to an apparatus or device consisting only of components A and B. It is intended that for the purposes of this disclosure, only the parts A and B of the device are specifically mentioned, but the claims should be further construed to include equivalents of these parts.

Generally, the compressed-gas drying systems of the present disclosure comprise a pressure vessel that includes a drying zone and a regeneration zone, and a rotational portion or rotor, such as a rotatable drum in the pressure vessel. The rotor or drum is a multi-chamber adsorbent fractionator containing an adsorbent medium, which serves as a regenerable desiccant. Additionally, a cooling zone may also be included.

In the first embodiment of the compressed gas dryer system shown in FIG. 1, a dryer 10 for a compressed gas system is provided for a compressed-gas source 60. Compressed-gas source 60 may be, for example, a compressor. However, the dryer system including dryer 10 may be provided with other compressed-gas sources, such as a pre-compressed gas tank, reservoir, or a supply pipe or line. Further, multiple dryers 10 may be provided within a compressed-gas system or along a compressed-gas line or pipe. The dryer 10 comprises: a pressure vessel 11, the pressure vessel 11 comprising a rotational symmetry in which a drying zone 12, a regeneration zone 13, and optionally a cooling zone 29 are defined. A rotor, for example, a drum 14, is provided in the rotationally symmetrical portion and provided with a multi-chamber adsorbent fractionator containing an adsorbent medium, which serves as a regenerable desiccant. The adsorbent medium may include silica gel, activated alumina, a molecular sieve, activated titanium dioxide, or activated carbon. A drive 114 or driving means is provided for rotating the drum relative to the rotational symmetry around axis X. i.e., rotating the drum 14 in the rotational symmetry or rotating the rotational symmetry around a stationary drum, such that the desiccant moves through the drying zone and the regeneration zone in succession. The drive 114 may include an electric motor. The drive 114 shown in the figures is shown schematically. And while drive 114 in FIG. 1 is provided along a rotational axis X of the drum 14, this is not necessarily the case. Drive 114 may be provided at a position offset from the rotational axis of the drum 14. The motor of drive 114 is controllable, and may be of a variable speed or may only be controllable by turning on and off. Drive 114 may further cause drum 14 to rotate by a driving means, which may include a transmission, gears, pulleys, belts, chains, and/or, a drive shaft, or other means that transfer rotation from a motor or engine to cause rotation of the drum. Further, the drive 114 may be within the pressurized volume of the dryer or may be exterior to the pressurized volume of the dryer.

Compressed gas to be dried is supplied to drying zone 12 within the pressure vessel 11 by main line 18, which supplies the compressed gas to be dried to inlet 15 of the drying zone. Compressed gas that has been dried exits the drying zone at outlet 16, which is connected to the remaining, downstream portion of the compressed gas system (not shown). Regeneration gas is provided to the regeneration zone 13 within the pressure vessel 11 by connection line 17 which provides regeneration gas or air from regeneration gas source 67 to inlet 25 of the regeneration zone 13. And regeneration air exits the regeneration zone 13 at outlet 26 to connection line 19, which may be returned to regeneration air source 67 through a supply line (not shown) or may be further used, as described in the various embodiments provided below. As described herein, regeneration gas source 67 may be provided with compressed gas from compressed gas source 60, such as by a compressor. Or alternatively, regeneration gas source 67 may be provided with a regeneration air or gas from an entirely separate source, such as from another compressor or a separate pipe, line, or compressed gas system. Cooling zone 29 may be supplied by a cooling agent by a separate cooling supply line (not shown).

In the embodiment according to FIG. 1, the following temperature sensors may be provided for measuring the temperature of the respective compressed gas flow: a temperature sensor T1 at the inlet 15 of the drying zone 12; a temperature sensor T2 at the outlet 16 of the drying zone 12; a temperature sensor T3 at the inlet 25 of the regeneration zone 13; and a temperature sensor T4 at the outlet 26 of the regeneration zone 13. Temperature sensors T1, T2, T3, T4, and/or any other temperature sensors within the dryer 10 may include one or more thermocouples, liquid or gas thermometers, electrical thermometers including, for example, an electric resistance thermometer, silicone diode, bimetallic devices, bulb and capillary sensors, sealed bellows, and/or a radiation thermometry device, or any other type of temperature sensing device.

In the embodiment of FIG. 1, a control unit or controller 100 is provided. Controller 100 comprises a processor 150, for example, a microprocessor, a memory storage 160, an output interface 170, and an input interface 180. Controller 100 receives input signals through input interface 180, which may be received through wired or wireless means, and processes received sensor signals obtained from sensors within the dryer system 10. For example, controller 100 receives temperature signals from temperatures sensors T1, T2, T3, and T4, and further may receive temperature signals from other temperature sensors including temperature sensors T21, T22, T41, and T42, described below. And as described herein, controller 100 outputs control signals to components of the dryer system through output interface 170. As described in more detail below, based on the received sensor signals obtained from the sensors of the dryer system 10, control 100 sends control signals to adjust operational parameters of the dryer system. For example, in a preferred embodiment, controller 100 is configured to transmit control signals 101 to driver 114 to adjust the speed of frequency of the driver's rotation of the drum, or to turn the driver 114 on or off, depending on the input the driver 114 is configured to receive.

Figure 2:
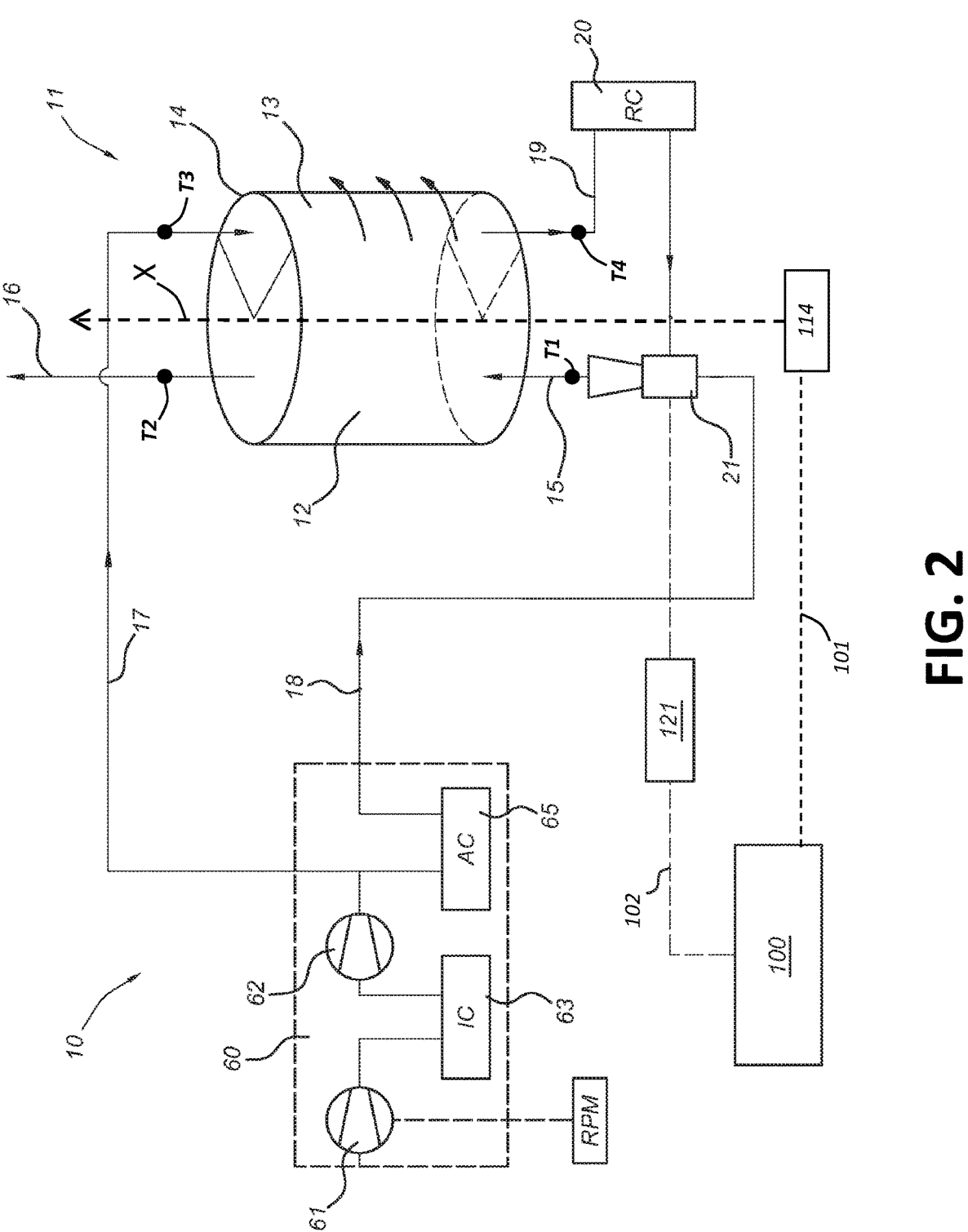
FIG. 2 shows another embodiment of a compressor installation comprising a dryer system.

In the embodiment of the compressed gas dryer system shown in FIG. 2, a dryer 10 for compressed gas is provided to a compressed-gas source, for example, a compressor 60. Although a compressor 60 is shown in FIG. 1, the dryer system including dryer 10 may be provided with other compressed-gas sources, such as pre-compressed gas. Further, multiple dryers 10 may be provided within a compressed-gas system. The dryer 10 comprises: a pressure vessel 11, the pressure vessel 11 comprising a rotational symmetry in which a drying zone 12 and a regeneration zone 13 are defined; a drum 14 provided in the rotationally symmetrical portion and provided with a multi-chamber adsorbent fractionator containing an adsorbent medium, which serves as a regenerable desiccant. The adsorbent medium may include silica gel, activated alumina, a molecular sieve, activated titanium dioxide, or activated carbon. A drive 114 is provided for rotating the drum relative to the rotational symmetry around axis X, i.e., rotating the drum 14 in the rotational symmetry or rotating the rotational symmetry around a stationary drum, such that the desiccant moves through the drying zone and the regeneration zone in succession.

In a preferred embodiment, the rotationally symmetric portion is cylindrical. However, this is not essential and other rotationally symmetrical shapes are possible. The dryer further includes: an inlet 15 connected to an inlet side of the drying zone of the pressure vessel 11 for supplying compressed gas to be dried; and an outlet 16 connected to an outlet side of the drying zone of the pressure vessel 11 for discharging the dried compressed gas. The gas to be dried may be supplied by compressed-gas source, for example, a compressor 60. The compressor 60 may comprise a first compression stage 61, a second compression stage 62 and an interposed cooler ("intercooler") ("IC") 63.

Figure 3:
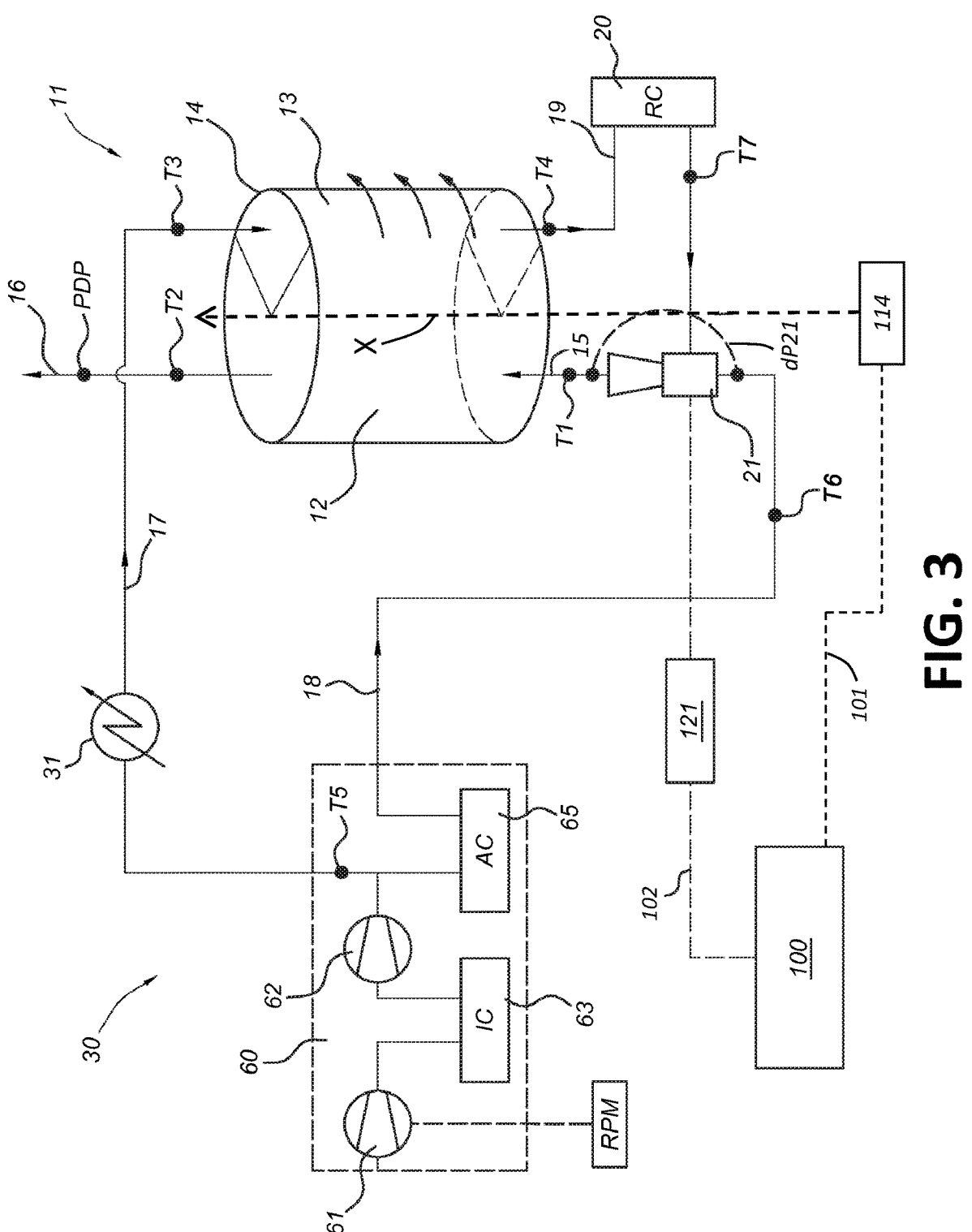
FIG. 3 shows another embodiment of a compressor installation comprising a dryer system.
Figure 4:
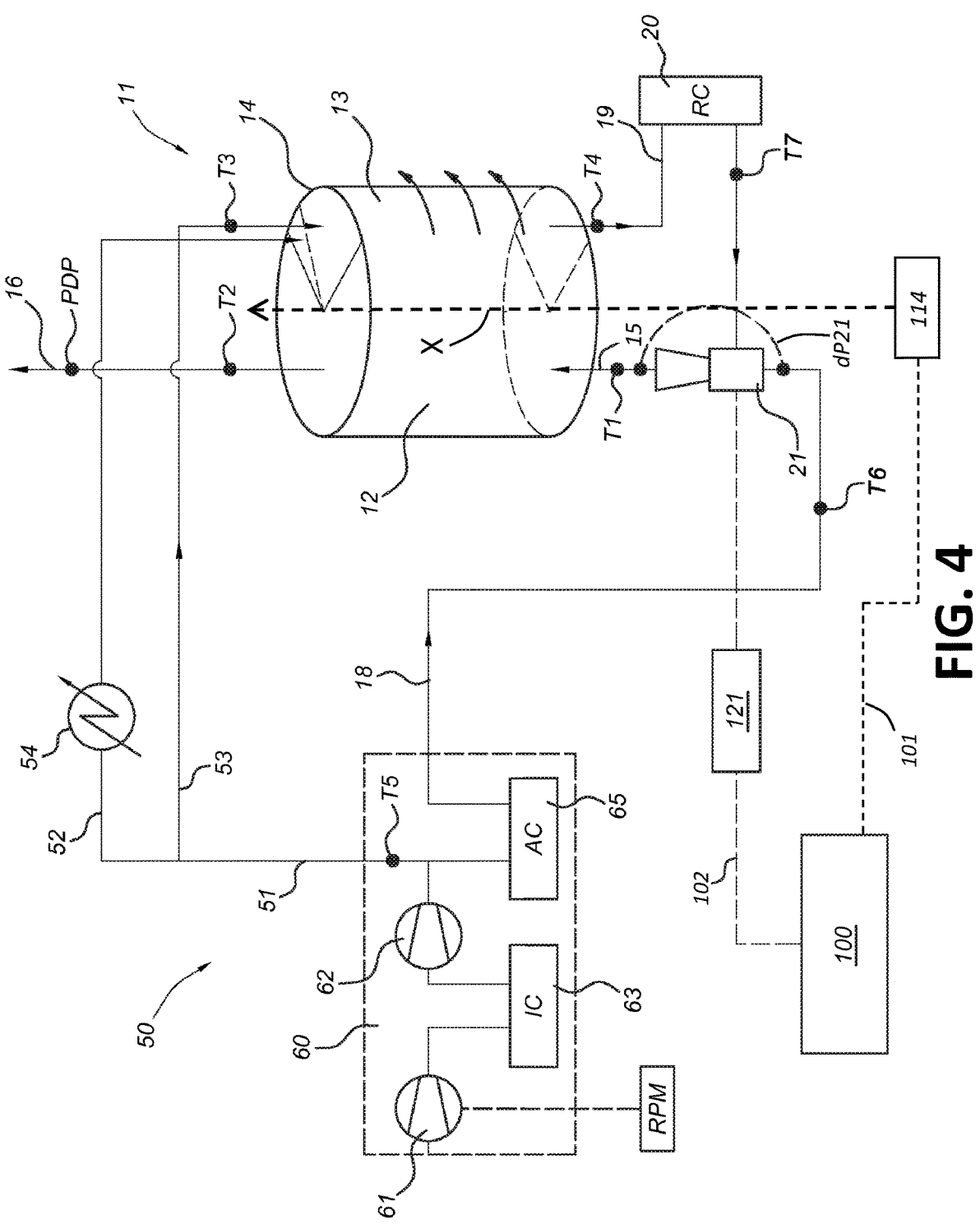
FIG. 4 shows another embodiment of a compressor installation comprising a dryer system.
Figure 5:
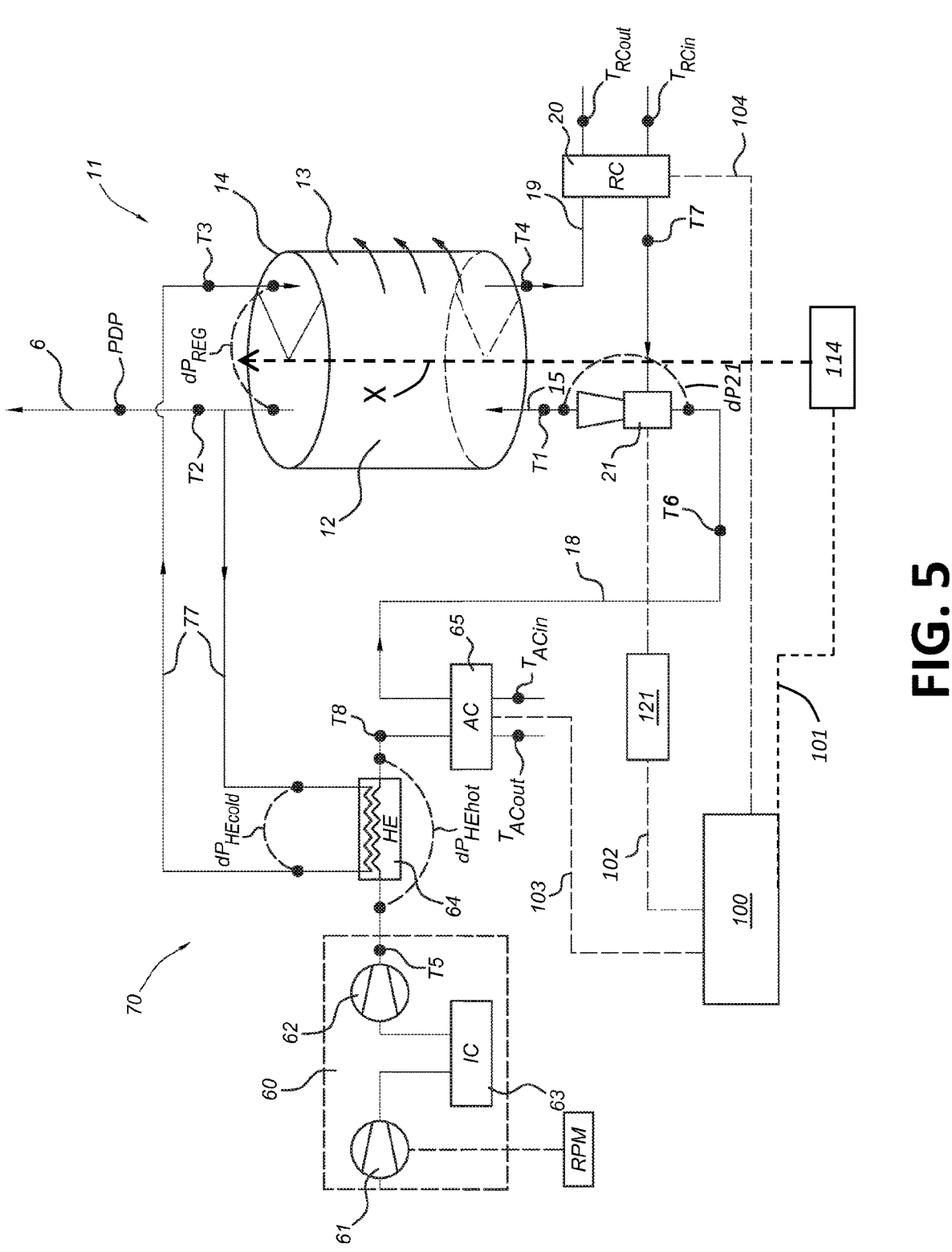
FIG. 5 shows another embodiment of a compressor installation comprising a dryer system.

Similar elements as shown in the embodiment of FIG. 1 are also included in the embodiments of FIGS. 2 to 6, with FIGS. 2, 3, 4, 5, and 6 respectively showing dryers 10 30, 50, 70, and 90. In each case, the dryer comprises: a pressure vessel 11, the pressure vessel 11 comprising a rotational symmetry in which a drying zone 12 and a regeneration zone 13 are defined; a drum 14 provided in the rotationally symmetrical portion and provided with a regenerable desiccant; a drive 114 for rotating the drum relative to the rotational symmetry, i.e. rotating the drum 14 in the rotational symmetry or rotating the rotational symmetry around a stationary drum, such that the desiccant moves through the drying zone and the regeneration zone in succession (although not shown in FIGS. 2-4). Preferably, the rotationally symmetric portion is cylindrical; however, this is not essential and other rotationally symmetrical shapes are possible. The dryer further includes: an inlet 15 connected to an inlet side of the drying zone of the pressure vessel 11 for supplying compressed gas to be dried; and an outlet 16 connected to an outlet side of the drying zone of the pressure vessel 11 for discharging the dried compressed gas. The gas to be dried is supplied by a compressor 60, which compressor 60 may comprise a first compression stage 61, a second compression stage 62 and an interposed cooler ("intercooler") ("IC") 63. As shown in the embodiment of FIG. 5, the delivery line from the compressor 60 to the inlet 15, the compressed gas may pass through a heat exchanger (heat exchanger HE) 64 and/or a cooling device (aftercooler AC) 65.

In the embodiment of FIG. 1, a control unit or controller 100 is provided. Controller 100 receives and processes sensor signals within the dryer system, and particularly Controller 100 receives temperature signals from temperatures sensors T1, T2, T3, and T4, and further may receive temperature signals from other temperature sensors including temperature sensors T21, T22, T41, and T42, described below. As described in more detail below, based on the received sensor signals obtained from the sensors of the dryer system 10, control 100 sends control signals to adjust operational parameters of the dryer system. For example, in a preferred embodiment, controller 100 is configured to transmit control signals 101 to driver 114 to adjust the speed of frequency of the driver's rotation of the drum, or to turn the driver 114 on or off, depending on the input the driver 114 is configured to receive and adjust to.

In the embodiments according to FIGS. 2 to 4, at the outlet side of the compressor 60, a portion of the compressed gas to be dried (having an increased temperature due to the compression) branches off and is passed to the regeneration zone for regeneration. In the embodiment according to FIG. 2, this is done via the connection line 17 without further heating of the partial streams. In the embodiment according to FIG. 3, the partial flow is first further heated by an active heating device 31, for example an electric heating device. In the exemplary embodiment according to FIG. 4, the partial flow 51 is first of all further divided into a first partial flow 52 and a second partial flow 53, wherein only the first partial flow 52 is further heated by the heating device 54. As shown, the first partial flow 52 and the second partial flow 53 are introduced into different regions of the regeneration zone 13, respectively.

Figure 6:
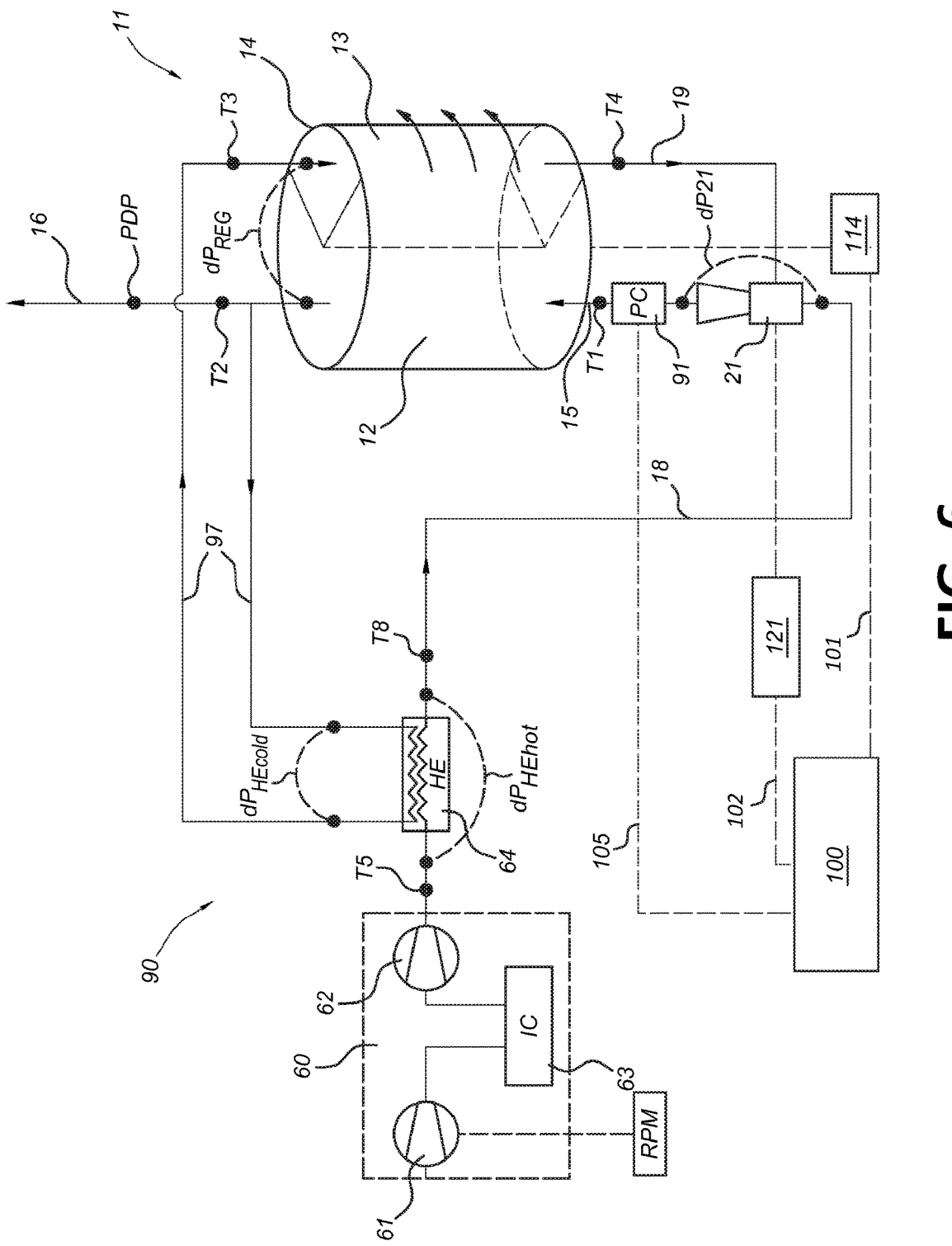
FIG. 6 shows another embodiment of a compressor installation comprising a dryer system.

In the embodiments according to FIGS. 5 and 6, the connection lines 77, 97, respectively, are provided on the outlet side of the dryer for branching off a partial flow stream of the dried compressed gas. The partial flow stream of the dried compressed gas is directed through heat exchanger 64 to be heated with the heat present in the supply stream as a result of compression and then further directed to regeneration zone 13.

In each of the embodiments according to FIGS. 2 to 6, the partial flow for regeneration is returned via a connection line 19 to the main line 18 for the supply flow of compressed gas to be dried. This is done by a controllable device such as a venturi ejector 21 or other controllable device for creating a pressure differential and maintaining a split flow for regeneration, as described further herein. One or more cooling devices, for example, the illustrated aftercooler 65 ("aftercooler AC") and/or the regenerative cooler 20 ("regenerative cooler RC") and/or the process cooler 91 ("process cooler PC"), may be provided in the connection line 19 and/or the main line 18 and/or at the inlet 15 (after merging), each cooler being provided for cooling a respective gas flow by means of a coolant, for example cooling water or ice water.

Similar to the embodiment of FIG. 1, in the embodiments according to FIGS. 2 to 6, the following temperature sensors may be provided for measuring the temperature of the respective compressed gas flow: a temperature sensor T1 at the inlet 15 of the drying zone 12, a temperature sensor T2 at the outlet 16 of the drying zone 12, a temperature sensor T3 at the inlet 25 of the regeneration zone 13, and a temperature sensor T4 at the outlet 26 of the regeneration zone 13.

Additionally, temperature sensors may be provided within respective zones of the pressure vessel 11. For example, as shown in the embodiment of FIG. 1, at least a first regeneration zone temperature sensor T41 may be provided at a first position within regeneration zone 13, at the outlet side of the regeneration zone 13. And a second regeneration zone temperature sensor T42 may be provided at a second position within regeneration zone 13, at the outlet side of the regeneration zone 13. In a preferred embodiment, first regeneration zone temperature sensor T41 is provided in, on, or coupled to a stator housing of the pressure vessel at the first position at the outlet side of the regeneration zone 13. And also in a preferred embodiment, second regeneration zone temperature sensors T42 is provided in, on, or coupled to a stator housing of the pressure vessel at the second position at the outlet side of the regeneration zone 13. Further temperatures sensors may be included in the regeneration zone 13.

Additionally or alternatively, as shown in the embodiment of FIG. 1, at least a first drying zone temperature sensor T21 may be provided at a first position within drying zone 12. And a second drying zone temperature sensor T22 may be provided at a second position within drying zone 12. In a preferred embodiment, first drying zone temperature sensors T21 is provided in, on, or coupled to a stator housing of the pressure vessel at the first position within drying zone 12. And also in a preferred embodiment, second drying zone temperature sensors T22 is provided in, on, or coupled to a stator housing of the pressure vessel at the second position within drying zone 12. Further temperatures sensors may be included in the drying zone 12. And though not shown, different temperature sensors may also be provided at different positions within cooling zone 29.

In the embodiments according to FIGS. 1 to 6, the following additional temperature sensors may be provided for measuring the temperature of the respective compressed gas flow: a temperature sensor T5 at the outlet side of the compressor (while being the inlet side of the heat exchanger 64 or aftercooler 65), a temperature sensor T6 in the main line 18 (between the aftercooler 65 and the venturi ejector 21), a temperature sensor T7 in the connection line 19 (between the regenerative cooler 20 and the venturi ejector 21), and a temperature sensor T8 at the outlet side of the heat exchanger 64. Respective output signals or data from temperature sensors T5 to T8 are transmitted, either through hard wiring or wireless communication, to control unit or controller 100, and may be further used by controller 100 to adjust or modify other operation parameters of dryer 10.

In the embodiments according to FIGS. 1 to 6, pressure sensors can be provided for measuring the pressure difference in the respective compressed gas flow over the respective elements, in each case providing a measure of the respective gas flow, as follows:

dP 21: a pressure sensor for measuring the differential pressure across the venturi ejector 21 (see also FIG. 6);

$dP_{REG}$: a pressure sensor for measuring the pressure difference between the outlet side of the drying zone 12 and the inlet side of the regeneration zone 13;

$dP_{HEhot}$: a pressure sensor for measuring the pressure difference generated by the heat exchanger 64 in the supply flow of compressed gas to be dried supplied by the compressor 60;

$dP_{HEcold}$: a pressure sensor for measuring the pressure difference generated by the heat exchanger 64 in the partial flow branched off for regeneration purposes.

In the exemplary embodiments according to FIGS. 1 to 6, the following sensors can additionally be provided:

"RPM": a sensor for measuring the rotational speed of the compressor 60, providing a measure of the flow of the supply gas to be dried;

"PDP": a pressure dew point sensor for measuring the pressure dew point at outlet 16;

$T_{ACin}$ and $T_{ACout}$: temperature sensors for measuring the coolant (cooling water) temperature at the inlet and outlet of the after cooler 65;

$T_{RCin}$ and $T_{RCout}$: temperature sensors for measuring the temperature of the coolant (cooling water) at the inlet and outlet of the regenerative cooler 20;

$T_{PCin}$ and $T_{PCout}$: temperature sensors for measuring the temperature of the coolant (cooling water) at the inlet and outlet of the process cooler 91.

In the embodiments according to FIGS. 1 to 6, a control unit 100 is provided in each case. Each of the above sensors may be provided with means for communicating with the control unit 100. The communication connection may be wireless or wired; for the sake of clarity, they are not shown in FIGS. 1 to 6. Respective output signals or data from these sensors are transmitted, either through hard wiring or wireless communication, to control unit or controller 100, and may be further used by controller 100 to adjust or modify other operation parameters of dryer 10 (or dryers 30, 50, 70, and 90).

In the embodiments according to FIGS. 2 to 6, in each case at least the merging means which merges the partial flow for regeneration with the main flow of the supply gas to be dried is designed as a controllable device 21, 121. The control unit 100 may be arranged for processing at least one measurement value provided by the above-mentioned sensor, for determining a control signal for a controllable device on the basis of the at least one measurement value, and for applying the control signal to the controllable device. The controllable means may comprise, for example, a venturi ejector 21 with a controllable opening (see FIG. 6). The controllable device may further comprise: a blower having a control for blower speed; or a plurality of smaller venturi ejectors or nozzles arranged in parallel with respective controls for opening or closing them respectively. This has the advantage that the controllable device can be smaller in size than a single venturi ejector, and therefore can be better integrated into the pressure vessel. Also, alternatively, the controllable device may comprise a venturi ejector with a controllable bypass around it. Other controllable devices are also possible.

The temperature-based control of the control unit or controller 100 will now be described. First, the controller 100 may provide temperature-based monitoring of the rotation of the drum of a rotary drum dryer. In rotary drum dryers, it is crucial to guarantee that the drum is rotating at all times. Further, it is important that the drum is rotating in the correct direction at all times. For example, the drum 14 in the embodiment of FIG. 1 is configured to rotate in the counter-clockwise direction, as shown with the rotational annotations. In the examples described herein, the drum or rotor is shown as being configured to rotate in the counter-clockwise direction when viewed from above. But the inventive concepts described herein should not be limited thereby, and the dryer system could include a pressure vessel and internal rotor configured to rotation in the clockwise direction when viewed from above, although this may be less common in the industry.

In the case that the rotary drum 14 stops rotating or begins rotation in the wrong direction, serious damage to the components of the dryer 10 (or dryers 30, 50, 70, and 90) and compressed air system may be caused if the non-rotation or mis-rotation is not detected and quickly corrected. As mentioned, this problem is typically addressed with sensors provided in the motor or in or on the rotary drum, or within some portion of the dryer system to directly measure a position or rotational vector of the rotary drum, a shaft of the rotary drum, or within the motor itself. For example, such rotational sensors may include a Hall effect sensor, or a set of Hall effect sensors associated with one or more magnets. Other sensors are known to directly/physically measure the position of the rotary drum or associated rotating components. However, such sensors occupy additional space within the dryer system, require additional componentry and hardware, require use of additional current cubicles and pin-connectors, and require additional input signal processing and analysis. Further, the additional sensors are subject to failure and mis-readings, and fail to give correct feedback in a case of failure in the mechanical connection between the rotor and the motor (pins).

The shortcomings of rotational or positional sensors are addressed in the present disclosure by a temperature-based monitoring of the position or rotational direction and speed based on signals transmitted by the temperature sensors of the dryer system. Indeed, the position, rotational direction, and rotational speed may be determined and monitored based on temperature information alone obtained by the temperature sensors of the dryer system. Based on the temperature information alone, the inventor of the present disclosure has found that a stoppage of the rotation of the drum can be detected and identified within one minute or less of the actual stopping of the rotation of the drum.

Figure 7B:
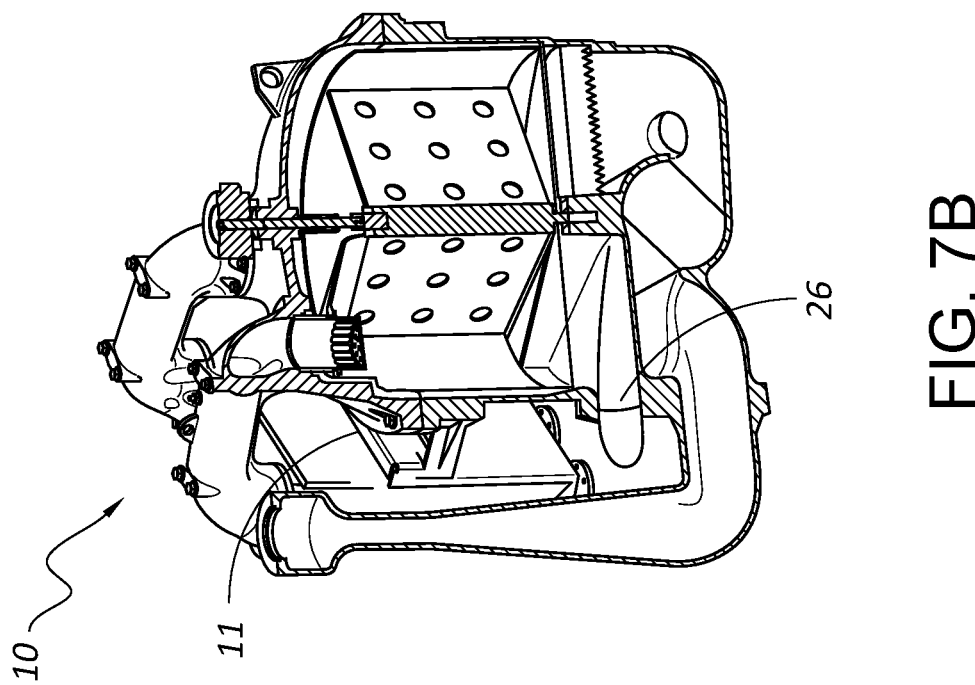
FIGS. 7A, 7B, 7C, 7D, 7E, and 7F show an embodiment and further details and processing of sensor signals from the embodiments of FIGS. 1 to 6.
Figure 7A:
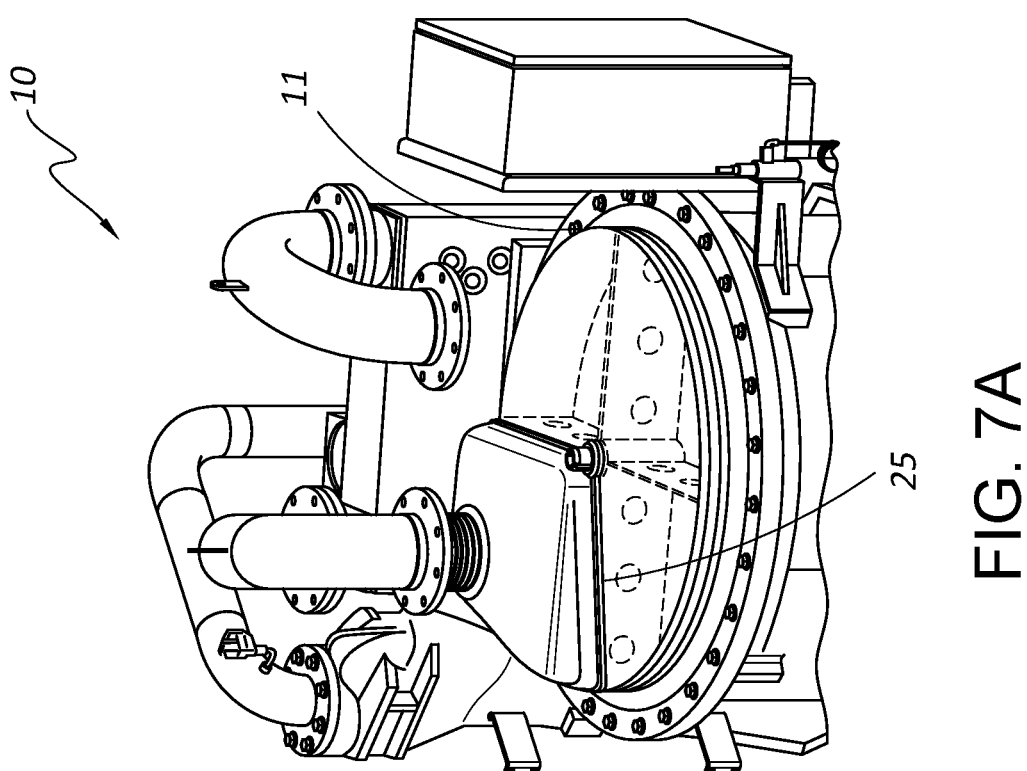

FIGS. 7A and 7B show another embodiment of a dryer 10 (or dryers 30, 50, 70, and 90) including a pressure vessel 11 in which a regeneration zone is provided with an inlet 25 and an outlet 26.

Figures 7C, 7D:
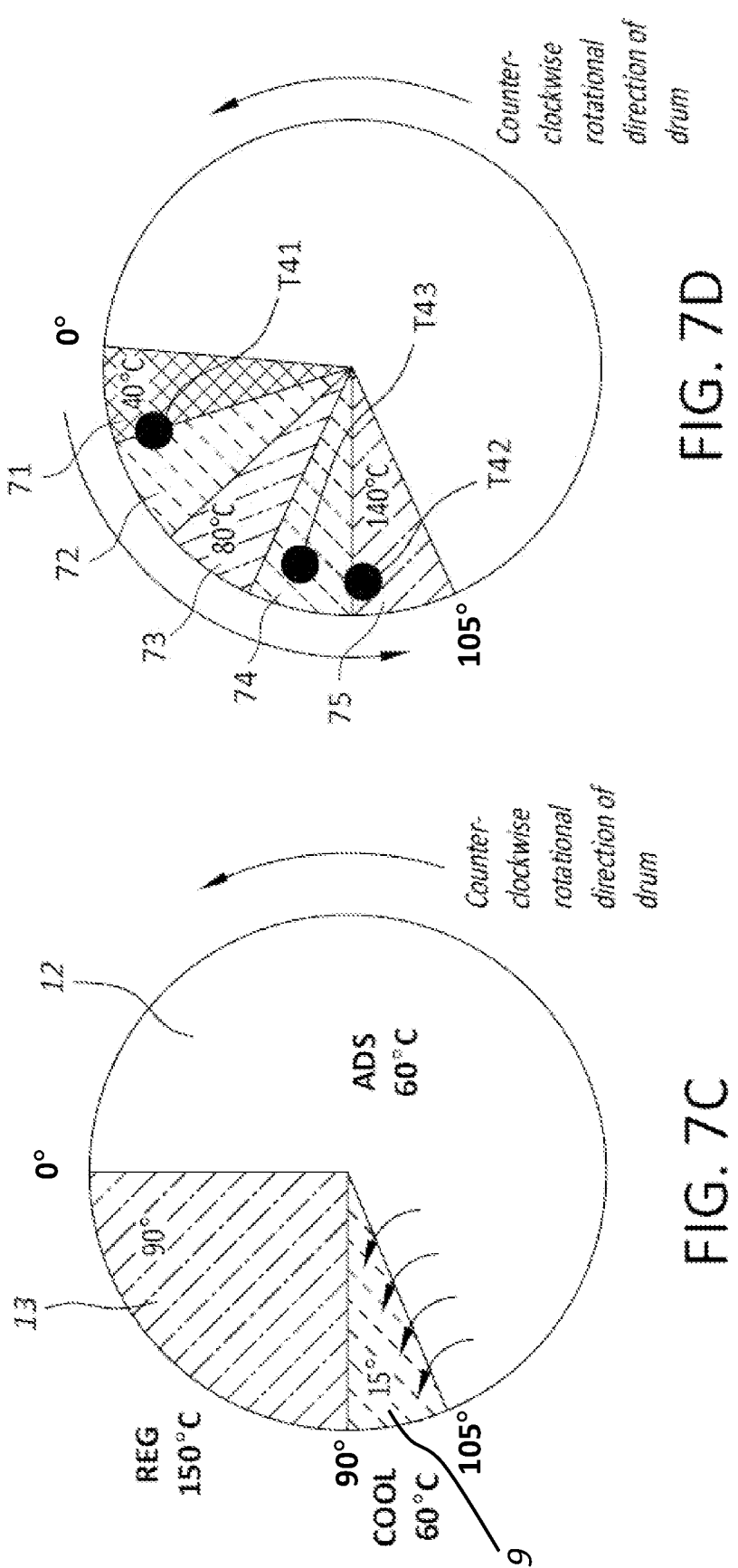

FIG. 7C shows a schematic top-down view of the respective zones of the dryer 10 (or dryers 30, 50, 70, and 90) of the embodiment of FIGS. 7A and 7B or of the embodiments of FIGS. 1-6, including drying zone 12, regeneration zone 13, and cooling zone 29. In the embodiment of FIG. 7C, the regeneration zone 13 extends around about 90° of the circle defining the cylindrical pressure vessel or drum, with a starting point or origin of the circle beginning at the position labeled 0° and the regeneration zone extending to the position labeled 90°. So, in the case that the regeneration zone extends around 90° of the circle defining the cylindrical pressure vessel or drum, the regeneration zone extends around or occupies about ¼ of the volume defining the cylindrical pressure vessel or drum. However, the regeneration zone 13 may extend around greater than 90° or less than 90°. For example, the regeneration zone 13 may extend within a range of 10° to 270° of a cross-sectional circle around an axis of the cylindrical pressure vessel or drum. In embodiment, the regeneration zone extends around 180° of a cross-sectional circle around an axis of the cylindrical pressure vessel or drum so that the regeneration zone occupies half of the volume of the cylindrical pressure vessel or drum. Preferably the regeneration zone 13 extends within a range of 45° to 135° of a cross-sectional circle around an axis of the cylindrical pressure vessel or drum. More preferably the regeneration zone 13 extends within a range of 75° to 105° of a cross-sectional circle around an axis of the cylindrical pressure vessel or drum.

The cooling zone 29 extends around within a range of 5° to 45° of a cross-sectional circle around an axis of the cylindrical pressure vessel or drum. More preferably the cooling zone 29 extends around within a range of 10° to 30° of a cross-sectional circle around an axis of the cylindrical pressure vessel or drum. More preferably the cooling zone 29 extends around within a range of 10° to 20° of a cross-sectional circle around an axis of the cylindrical pressure vessel or drum. Typically, the cooling zone 29 extends around about 15° of a cross-sectional circle around an axis of the cylindrical pressure vessel or drum, from the portion labeled from 90° to 105°, as shown in the embodiment of FIG. 7C.

The drying zone 12 extends about the remaining degrees not covered by regeneration zone or the combination of the regeneration zone and the cooling sone. So in the example of the embodiment of FIG. 7C, the drying zone extends around the remaining 255° of a cross-sectional circle around an axis of the cylindrical pressure vessel or drum. Also, as shown in the example of the embodiment of FIG. 7C, a temperature within the drying zone 12 (otherwise known as the adsorption zone (ADS)) may be on average about 60° Celsius. The temperature within the drying zone 12 may range from 20° Celsius to 80° Celsius. The temperature within the cooling zone 29 may also range from 20° Celsius to 80° Celsius. By comparison, a temperature within the regeneration zone (REG)) 13 may be up to 150° Celsius.

An example of temperature-based rotational-status monitoring of the rotor or drum may be based on temperature information obtained by temperature sensors provided within respective zones within the pressure vessel. In the embodiment of FIG. 7D, various sections may be considered to extend around the cross-sectional circle around an axis of the cylindrical pressure vessel or drum, with a starting point or origin of the circle beginning at the position labeled 0°, including generally equally sized sections 71, 72, 73, 74, and 75, which overlap with the regeneration zone 13 and at least a portion of the cooling zone 29.

At least a first temperature sensor T41 is provided at a first position within regeneration zone 13 and a second regeneration zone temperature sensor T42 provided at a second position within regeneration zone 13, as shown in FIG. 1 and FIG. 7D. In a preferred embodiment, first regeneration zone temperature sensors T41 is provided in, on, or coupled to a stator housing of the pressure vessel at the first position within regeneration zone 13. And also in a preferred embodiment, second regeneration zone temperature sensors T42 is provided in, on, or coupled to a stator housing of the pressure vessel at the second position within regeneration zone 13. As described herein, monitoring of a rotational status of the rotor or drum may include determining a rotational position of the rotor, a rotational speed of the rotor, whether the rotor is stopped or in other words, whether the rotor is not rotating in relation to the pressure vessel, and a rotational direction of the rotor or rotary drum.

FIG. 7D shows what have been determined by the inventor of the present disclosure to show a typical evolution of temperatures across the regeneration outlet sector that extend across a total of about 105° (90°+15°=) 105° of the circle defining the cylindrical pressure vessel or drum, beginning at the origin or starting position labeled as 0° to the position labeled as 105°. Because the regeneration gas or regeneration air is provided at a higher temperature than the compressed gas or compressed air to be dried in the drying zone, the temperature within the regeneration area increases, and is greater at the second position detected by the second regeneration zone temperature sensor T42 than at the first position detected by the first regeneration zone temperature sensor T41. In a preferred embodiment, the first regeneration zone temperature sensor T41 is provided at an early stage of regeneration zone 13 (closer to the starting point or origin of) 0°, at about 0° to 45°, preferably 5° to 40°, more preferably 10° to 40°, and even more preferably between 20° to 25° from the origin of 0° within the regeneration zone 13. And the second regeneration zone temperature sensor T42 is provided at the second position, at a later stage of the regeneration zone, at a farther distance from origin 0°, at about 50° to 90° from the origin 0° within the regeneration zone 13, more preferably between 70° to 90° from the origin 0°, more preferably between 85° to 90° from the origin 0°, even more preferably at about 88° from the origin 0° within the regeneration zone 13.

Additionally, a third temperature sensor T43 may be included at a third position within regeneration zone 13, for example within section 74. Temperature sensor T43 may not be necessary or required. However, temperature data obtained from the third temperature sensor T43 is provided herein to provide a better understanding of the change in temperature within the different portions of the regeneration zone 13 when the rotor is properly rotating and when the rotor is stopped, relative to the pressure vessel 11.

Figure 7E:
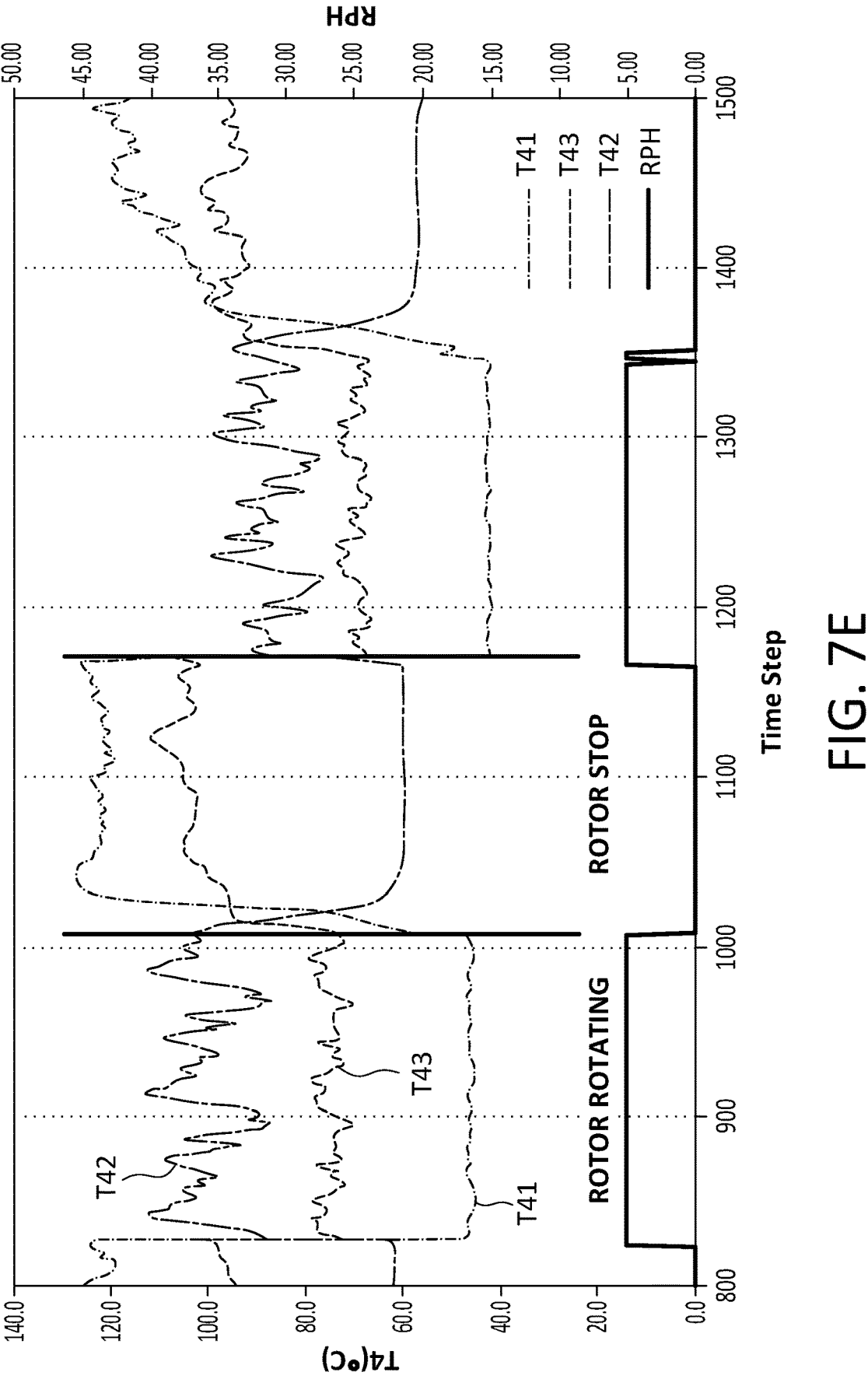

FIG. 7E shows temperature sensor signals received from temperature sensors T41 and T42, and temperature sensor T43 received at controller 100. The rotation or stoppage of rotor relative to the pressure vessel is provided in the bottom FIG. 7E. The signal and data obtained from temperature T41 and T42 are of particular importance, as a stoppage of the rotation of the drum can be detected by a rapid increase of temperature sensed by temperature sensor T41. When the rotor is rotating, the temperature sensed by T41 is typically the lowest temperature of the temperatures sensed by sensors T41, T42, or T43, whereas when the rotor is stopped, the temperature sensed by T41 is typically the highest of the temperatures sensed by sensors T41, T42, or T43. A stoppage also causes a significant decrease at temperature sensor T42, which is typically the highest of the temperatures sensed by sensors T41, T42, or T43 under normal rotation of the rotary drum. However, when the rotor becomes stopped, the temperature of T42 becomes the lowest of the temperatures sensed by sensors T41, T42, or T43, due to interaction with the adjacent cooling flow of the cooling zone 29. That is, the proximity of the temperature sensor T42 to the cooling zone 29 causes the temperature at the position of sensor T42 to become cooler.

In another embodiment, the correct direction of rotation of the rotary drum or a stoppage of the rotation of the rotary drum may efficiently and effectively be determined with the following equations:

If $T42-T41<0$, then $RPH=0$; and

Otherwise, $T42-T41>0$.

Figure 7F:
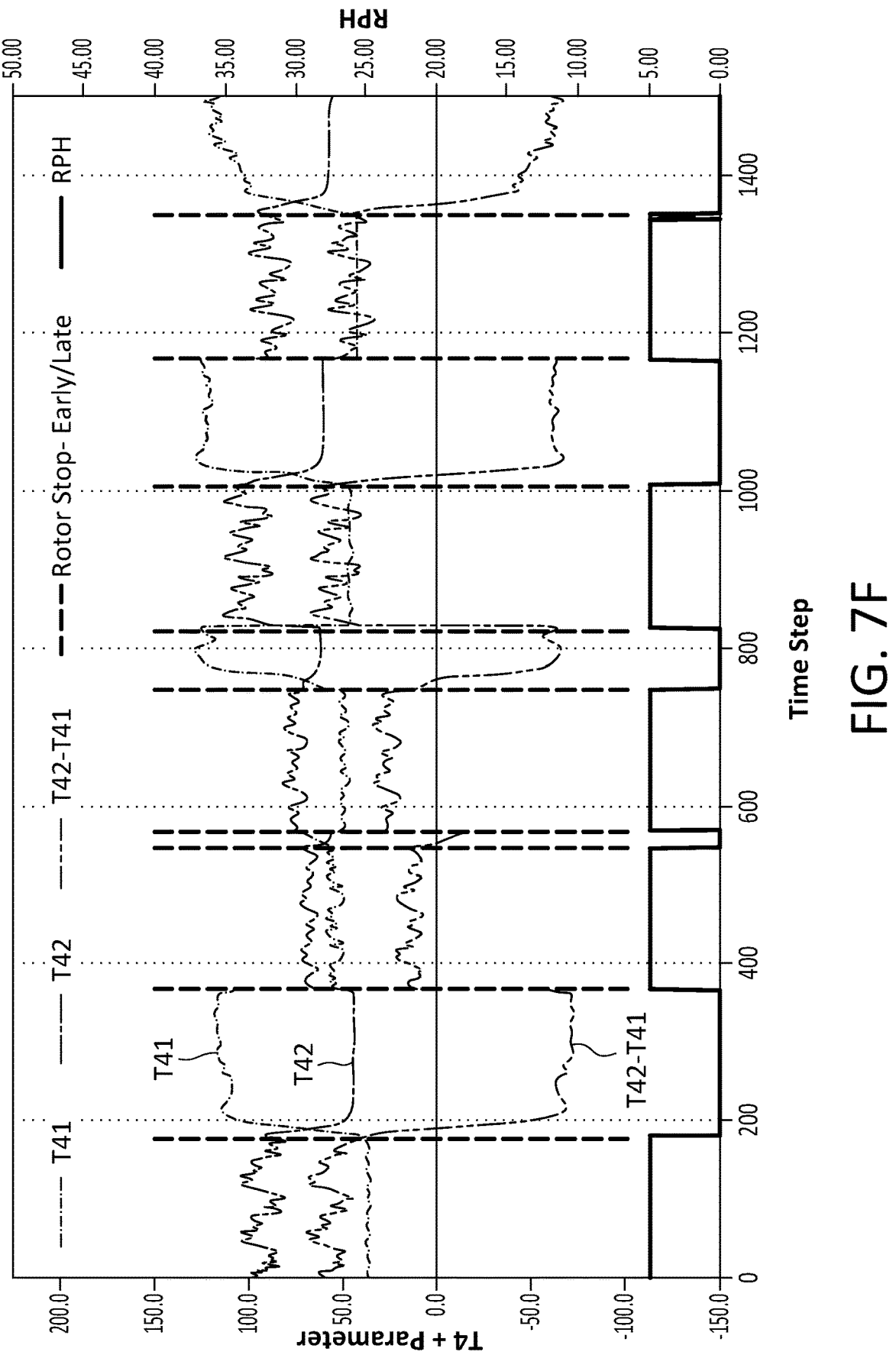

FIG. 7F shows additional information regarding a determined rotation per hour (RPH) of the rotary drum based on temperature sensor signals received from temperature sensors T41 and T42 at controller 100. Similar to FIG. 7E, the rotation or stoppage of rotor relative to the pressure vessel is provided in the bottom FIG. 7F, with the actual measured RPH of the rotor. The double-dashed line "" —— —— "" represents the calculation of the normally highest temperature at sensor T42 (at the latter portion of the regeneration zone in view of the rotation of the rotor) minus the temperature at the normally lowest temperature at sensor T41 (at the earlier portion of the regeneration zone). The respective temperatures at T42 ("(" —— · —— ") ") and T41 (" ("— · —") ") are also shown in the graphed data of FIG. 7F. It can thus be seen when a stoppage occurs in the rotor in relation to the pressure vessel, as shown when the double-dashed line ""— — — —" " goes below zero, which correlates with the known stoppage (RPH=0) as shown in the labeled measured RPH at the bottom of the graph. Similarly, if the direction of rotation of the rotary drum were reversed, this too would be detected with an analysis of the temperature data received from sensors T41 and T42, as the temperatures at the two respective positions would become the reverse as compared to when the rotary drum is rotated in the correct (counter-clockwise) direction.

Thus, temperature-based monitoring of the rotational position, speed, or direction based on temperature readings obtained by the temperature sensors of the dryer system and transmitted to the controller 100 for monitoring and analysis provides a cheaper, quick, and "bullet-proof" solution for the problem of identifying stoppage or incorrect rotation of the drum while opening space within the motor or dryer system and reducing current pin-connectors, and reduced costs. Additionally, because additional positional sensors, such as Hall effect sensors, are not required in the methods and system of the present disclosure, the system is less exposed to the risk of sensor failure.

Based on the temperature-based monitoring of the proper rotation of the rotor, a notification or alarm may be transmitted to a system operator or user by controller 100. Or the controller 100 may take remedial action to prevent damage to the system due to improper rotation of the rotor in relation to the pressure vessel (stoppage or rotation in the wrong direction).

In the above examples of embodiments of FIGS. 7C and 7D, three temperature sensors T41, T42, and T43 have been shown, which are provided in the regeneration zone 13. In a preferred embodiment, the dryer system includes two temperature sensors, a first temperature sensor T41 and a second temperature sensor T42, with first temperature sensor T41 arranged at a first position between 20° to 25° from the origin 0° within the regeneration zone 13 and second temperature sensor T42 arranged at a second position between 85° to 90° from the origin 0°, at about 88° from the origin 0°, and the regeneration zone extends across about 90° from the origin 0° of the rotor, a particularly rigorous rotational monitoring and determination of stoppage or rotation in the wrong direction can be made, as described above.

However, the inventive concepts of this disclosure should not be understood to be limited to or require two temperature sensors T41 and T42, as described above. For example, a single temperature sensor within the regeneration zone may be used only. For example, the temperature fluctuations at the relative positions of sensor T41 or T42 may be considered individually and solely to monitor the proper rotation of the rotor, based for example, on the data shown in FIG. 7E. Additionally, although in the embodiments described thus far, the temperature sensors are described as being within the pressure vessel. But this is not required. For example, a temperature sensor may be provided rather on the outside of the pressure vessel, for example, an thermocouple that measures temperature of the pressure vessel at a certain location or an infrared analyzer that obtains a temperature reading on an outside of the pressure vessel. What is significant is that the temperature data obtained is indicative of a temperature within the pressure vessel, and within a predetermined area or volume of the rotor.

As noted with sensor T43, additional or alternative temperatures sensors may be included in the regeneration zone 13. Additionally or alternatively, as shown in the embodiment of FIG. 1, at least a first drying zone temperature sensor T21 may be provided at a first position within drying zone 12. And a second drying zone temperature sensor T22 may be provided at a second position within drying zone 12. Further temperatures sensors may be included in the drying zone 12. And though not shown, different temperature sensors may also be provided at different positions within cooling zone 29. Similar to the analysis provided above for the temperature sensors provided in the regeneration zone, a stoppage or reverse movement of the rotary drum is detected in these embodiments by the analysis of the temperature data received at the controller 100 from sensors T21 and T22, or temperature sensor T21 individually or temperature sensor T22 individually within the drying zone or optionally within even the cooling zone 29.

Moreover, although the temperature sensors provided within the pressure vessel, such as sensors T41 and T42, are shown as examples as being provided near the bottom or the exit side of the regeneration zone, this does not necessarily have to be the case. The respective temperature sensors within the pressure vessel may be provided on a sidewall or any side within the zone to be measured. Nor must the temperature sensors used be within the same zone within the pressure vessel. Rather, a comparison of temperatures or a temperature measurement at a single position may be used to determine a rotation or non-rotational status of the rotary drum, or a rotational direction of the rotary drum.

In the embodiment according to FIG. 2, a second control signal 102 may be determined at least on the basis of an RPM sensor (compressor RPM: supply flow of compressed gas) and a dP21 sensor (pressure drop across the venturi ejector 21: flow of the partial flow), that is to say at least the flow of the partial flow branched off for regeneration is controlled on the basis of these two measurements. The control unit or controller 100 may be further arranged for determining the application of a third control signal for one or more cooling means to be input to aftercooler 65, for example, as shown in FIGS. 5 and 6.

In the embodiments according to FIGS. 5 and 6, the control unit may be arranged for determining and applying the control signal 101, the second control signal 102 and/or the at least one third control signal 103, 104, 105. These control signals may be determined by the control unit 100 based on one or more measurements from the following sensors: RPM sensor (compressor RPM: supply flow of compressed gas), dP21 (pressure drop across the Venturi ejector 21: flow split), $dP_{REG}$ (pressure drop between the outlet side of the drying zone 12 and the inlet side of the regeneration zone 13), $dP_{HEhot}$ (pressure drop in main flow across heat exchanger 64), $dP_{HEcold}$ (pressure drop in the split across heat exchanger 64), one or more of T1 through T8, pressure dew point sensor PDP.

In further embodiments (not shown), the control unit 100 may further be communicatively connected to a remote computer system, e.g. for remote monitoring, control, adjustment and/or software updating, etc., and data obtained by the control unit 100 and operation parameters transmitted by control unit 100 as control signals may be transmitted to the remote computer system or a data storage device for further analysis and/or processing.

Although not shown, venturi ejector 21 may be provided with a controllable opening driven by a drive rod with a gear drive. The pressure drop caused by the controllable openings in the main flow 18 of gas to be dried may be measured by pressure sensors P1 and P2 communicating with the control unit 100. The control unit 100 determines on the basis of this a control signal 102 to be applied to the driver 121. By changing the position of the controllable opening, the pressure drop, and thus the suction to which the partial flow 19 for regeneration is subjected, changes. In this way, the flow of the split stream for regeneration may be controlled.

As described above, in each of the embodiments according to FIGS. 1 to 6, the drive device 114 is provided to rotate the drum 14 relative to the rotationally symmetrical portion of the pressure vessel 11. The drive means may comprise a motor, preferably an electric motor. The electric motor may be configured to drive the rotor within the pressure vessel at a speed of more than 0 and less than 100 rotations per hour (RPH). A typical rotational speed of the rotor within the pressure vessel is less than 10 RPH. And a typical rotation speed of the rotor within the pressure vessel is around 5 RPH. The electric motor may have a variable speed controller or may have a start/stop controller. The speed of the electric motor, or whether the electric motor is started or stopped is controlled by a first control signal 101 from the control unit 100.

A start/stop controller is arranged to switch the motor on and off, thereby providing an adjustable average rotational speed of the drum relative to the rotational symmetry. More specifically, the start/stop controller is provided for switching the motor on and off during a preferably continuous operation of the dryer, wherein on the one hand a continuous flow of compressed gas is supplied to the drying zone and dried in the drying zone, and on the other hand a continuous (partial) flow of compressed gas to be dried is led to the regeneration zone for regenerating the drying agent. The start/stop controller is economically may be advantageous than, for example, a frequency control for adjusting the rotational speed of the electric motor, and thus may provide cost savings in terms of investment costs. Furthermore, a start/stop controller may be less complex and require less control electronics. In particular, the start/stop controller only needs to switch the motor on and off according to a desired duty cycle (in terms of on/off ratio) in order to provide a desired average rotational speed of the drum. In addition, the start/stop controller may rotate the drum in stages relative to the rotational symmetry, for example, to precisely move a section corresponding to the size of the regeneration zone (or a portion thereof) each time, and then stop the movement of that section for a given period of time. Another advantage of the start/stop controller is that the range of average rotational speeds is wider than when frequency control is employed; in particular, the average rotational speed may be adjusted from 0 to the maximum speed of the motor.

Figure 8A:
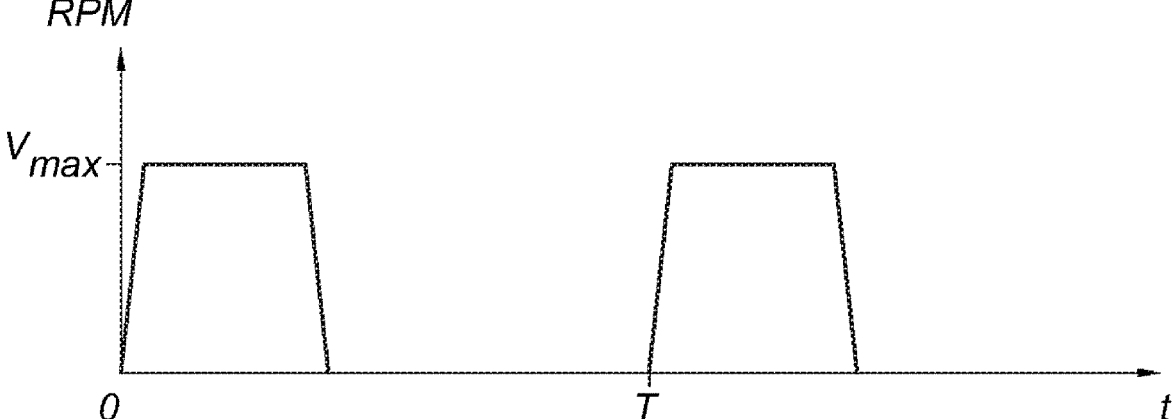
FIGS. 8A and 8B show an embodiment of a usable start and stop control device usable for driving the drum in the embodiment of FIGS. 1 to 6.
Figure 8B:
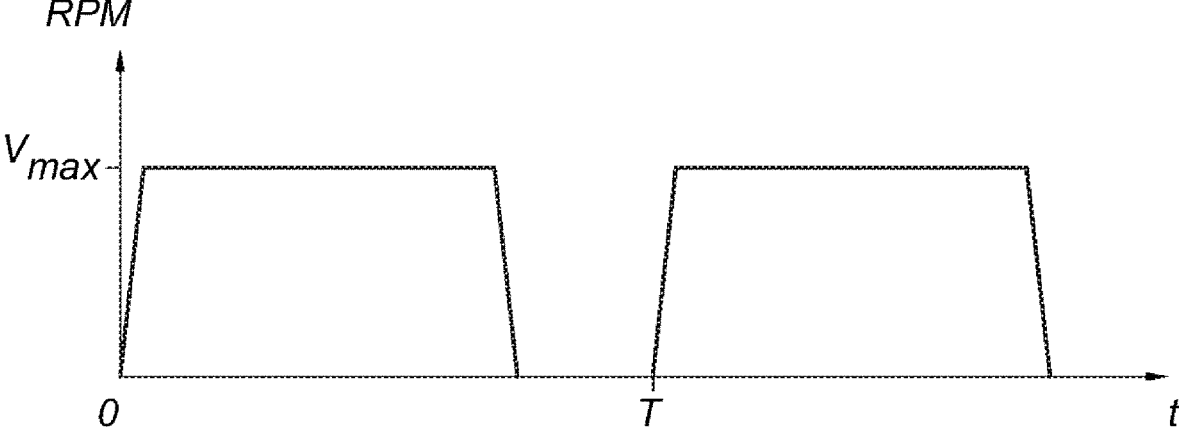

FIGS. 8A and 8B illustrate some examples of start/stop controllers. In FIG. 8A the average speed is the maximum motor speed $v_{max}\frac{1}{3}$, the average speed in FIG. 8B is the motor maximum speed $v_{max}\frac{2}{3}$ of (1). The duty cycle has a period T. The average speed can be varied by varying the time the motor is on during the period T. The average speed can also be varied by keeping the time the motor is on constant and varying the time the motor is off, which means that the length of the duty cycle Tis variable.

In another embodiment, which may be included with those described above, a relatively high temperature and saturated gas, such as air, is supplied to the inlet 15 for the gas to be dried. The gas being at a relatively high temperature T1 means that it has a relatively high moisture content, so the drying drum 14 needs to remove more moisture from the gas, which in turn means that more regeneration is required and therefore a higher flow rate of regeneration gas is required. By measuring the temperature T1, which may vary, for example, according to the ambient temperature of the compressor installation, a measure of the moisture load of the gas supplied to the inlet 15 can be derived. The control unit 100 may control the flow rate of the regeneration flow (split flow for regeneration) according to T1; specifically, as T1 increases, the control unit increases the flow rate, for example, according to a predetermined table or characteristic control curve. Normal operation of the dryer may be monitored by feedback provided by measurement of a pressure dew point sensor "PDP" at outlet 16.

In another embodiment, which may be included with those described herein, if the flow rate of the regeneration flow varies (e.g. in order to keep the pressure dew point PDP stable or within a certain range, or varies in dependence on pressure fluctuations), it is preferable to adjust the cooling of the outgoing regeneration flow 19 and/or to adjust the rotational speed of the drum 14 in dependence on the flow rate of the regeneration flow. By measuring the pressure drop across the venturi ejector 21, a measure of the regeneration flow rate can be obtained. The control unit 100 may, for example, control the flow rate of a cooling water flowing through a cooling device 20 for cooling the outgoing regeneration flow, or may control the flow rate of the cooling water flowing through the cooling device 91 for cooling the confluence (supply flow of the regeneration flow and the gas to be dried) so that more cooling is performed when the regeneration flow increases, thereby avoiding a situation where too little cooling is caused by an increase in the regeneration flow rate. In conjunction with this or independently of this, the control unit 100 can control the rotational speed of the drum 14 according to the regeneration flow rate to optimize the ratio between each other. In this way, the control unit may take into account the lifetime of the desiccant and may adjust the drum speed to accommodate any reduction in the regeneration or absorption ability of the desiccant over time.

In the above-noted parameters, it is noted that in preferable embodiments, T1 is based on the mixture provided for in the embodiments of FIGS. 2 to 6, wherein a partial flow for regeneration is returned via a connection line 19 to the main line 18 for the supply flow of compressed gas to be dried. This may be done by a controllable device such as a venturi ejector 21 or other controllable device for creating a pressure differential and maintaining a split flow for regeneration.

Embodiments of the present disclosure may comprise or utilize a special-purpose or general-purpose computer system, or a computing system, particularly in control unit or controller 100 or alternatively in communication with controller 100, that includes computer hardware, such as, for example, a processor 150 or more than one processor 150 and system memory 160, as discussed in greater detail below. Controller 100 may be in relatively close proximity to pressure vessel 11 and drive 114, and receive hardwire or wireless signals from other components of the dryer system and send hardwire or wireless signals to other components of the dryer system. Alternatively, controller 100 may be arranged remotely from other components of the dryer system and may receive signals from other components of the dryer system, including from one more temperature sensors providing temperature data indicative of one or more temperatures within the pressure vessel, and transmit signals to other components of the dryer system over a network, such as a local area network (LAN), a wide area network (WAN), the internet, or some other network.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media. Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be included within or accessed and executed by controller 100, a general-purpose, or a special-purpose computer system to implement the disclosed functionality of the disclosure.

Transmission media can include a network and/or data links which can be used to carry program code in the form of computer-executable instructions or data structures, and which can be accessed by a general-purpose or special-purpose computer system. A "network" may be defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions may comprise, for example, instructions and data which, when executed by one or more processors, cause a general-purpose computer system, special-purpose computer system, or special-purpose processing device to perform a certain function or group of functions. Computer-executable instructions may be, for example, binaries, intermediate format instructions such as assembly language, or even source code.

The disclosure of the present application may be practiced in network computing environments with many types of computer system configurations, including, but not limited to, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

The disclosure of the present application may also be practiced in a cloud-computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

A cloud-computing model can be composed of various characteristics, such as on-demand self-service, broad network access, resource pooling, rapid elasticity, measured service, and so forth. A cloud-computing model may also come in the form of various service models such as, for example, Software as a Service ("SaaS"), Platform as a Service ("PaaS"), and Infrastructure as a Service ("IaaS"). The cloud-computing model may also be deployed using different deployment models such as private cloud, community cloud, public cloud, hybrid cloud, and so forth.

Some embodiments, such as a cloud-computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Certain terms are used throughout the description and claims to refer to particular methods, features, or components. As those having ordinary skill in the art will appreciate, different persons may refer to the same methods, features, or components by different names. This disclosure does not intend to distinguish between methods, features, or components that differ in name but not function. The figures are not necessarily drawn to scale. Certain features and components herein may be shown in exaggerated scale or in somewhat schematic form and some details of conventional elements may not be shown or described in interest of clarity and conciseness.

This disclosure provides various examples, embodiments, and features which, unless expressly stated or which would be mutually exclusive, should be understood to be combinable with other examples, embodiments, or features described herein.

In addition to the above, further embodiments and examples include the following:

1. A compressed-gas dryer system comprising:

a compressed gas inlet configured to receive a compressed gas to be dried from a compressed gas source;

a regeneration gas inlet configured to receive a regeneration gas from a regeneration gas source;

a pressure vessel defining a drying zone and a regeneration zone, the drying zone having the inlet through which the compressed gas to be dried is received into the drying zone and an outlet through which dried compressed gas exits the drying zone, and the regeneration zone having the inlet through which the regeneration gas is received into the regeneration zone and an outlet through which the regeneration gas exits the regeneration zone;

a driver configured to drive rotation of a rotor provided in the pressure vessel in a predetermined rotational direction;

a first temperature sensor configured to obtain first temperature data indicative of a first temperature at a first position within the pressure vessel, and a second temperature sensor configured to obtain second temperature data indicative of a second temperature at a second position within the pressure vessel; and a controller configured to receive the first temperature data and second temperature data and based thereon, determine a rotational status of the rotor.

2. The dryer system according to any one or a combination of two or more of 1 above or 3-10 below, wherein the first temperature sensor is arranged at the first position in the regeneration zone within the pressure vessel, and the second temperature sensor is arranged at the second position in the regeneration zone within the pressure vessel.

3. The dryer system according to any one or a combination of 1-2 or 4-10 below or a combination thereof, wherein the second temperature sensor is arranged at the second position that is within a latter portion in the regeneration zone than the first temperature sensor in view of the rotation of the rotor.

4. The dryer system according to any one or a combination of two or more of 1-3 above or 5-10 below, wherein the first temperature sensor is arranged at the first position between 5° to 40° from an origin 0° within the regeneration zone, and the second temperature sensor is arranged at the second position between 50° to 90° within the regeneration zone.

5. The dryer system according to any one or a combination of two or more of 1-4 above or 6-10 below, wherein the second temperature sensor is arranged at the second position between 85° to 90° from the origin 0° within the regeneration zone.

6. The dryer system according to any one or a combination of two or more of 1-5 above or 7-10 below, wherein the second temperature sensor is arranged at the second position between 20° to 25° from the origin 0° within the regeneration zone.

7. The dryer system according to any one or a combination of two or more of 1-6 above or 8-10 below, wherein the first temperature sensor is arranged at the first position in the drying zone within the pressure vessel, and the second temperature sensor is arranged at the second position in the drying zone within the pressure vessel.

8. The dryer system according to any one or a combination of two or more of 1-7 above or 9-10 below, wherein the controller is configured to determine whether the rotor is stopped based on the received first and second temperature data.

9. The dryer system according to any one or a combination of two or more of 1-8 above or 10 below, wherein the controller is configured to determine the rotational status of the rotor based only on the received first and second temperature data.

10. The dryer system according to any one or a combination of two or more of 1-9 above, wherein the compressed-gas source is a compressor, and the regeneration gas source is a portion of a stream of a compressed gas output by the compressor.

11. A temperature-based method for determining a rotational status of a rotor of a compressed-gas dryer system, the compressed-gas system including a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction, the method comprising:

receiving first temperature data of a first signal obtained by a first temperature sensor, the first temperature data being indicative of a first temperature at a first position within the pressure vessel;
  receiving second temperature data of a second signal obtained by a second temperature sensor, the second temperature data being indicative of a second temperature at a second position within the pressure vessel; and
  determining, by a controller, the rotational status of the rotor based on the first temperature data obtained from the first temperature sensor the second temperature data obtained from the second temperatures sensor.

12. The method according to any one or a combination of two or more of 11 above or 13-20 below, further comprising providing the first temperature sensor at the first position at the outlet side of the regeneration zone within the pressure vessel, and providing the second temperature sensor at the second position at the outlet side of the regeneration zone within the pressure vessel.

13. The method according to any one or a combination of two or more of 11-12 above or 14-20 below, further comprising providing the second temperature sensor at the second position that is within a latter portion in the regeneration zone than the first temperature sensor in view of the rotation of the rotor.

14. The method according to any one or a combination of two or more of 11-13 above or 15-20 below, further comprising providing the first temperature sensor at the first position between 5° to 40° from the origin 0° within the regeneration zone, and providing the second temperature sensor at the second position between 50° to 90° from the origin 0° within the regeneration zone.

15. The method according to any one or a combination of two or more of 11-14 above or 16-20 below, further comprising providing the second temperature sensor at the second position between 85° to 90° from the origin 0° within the regeneration zone.

16. The method according to any one or a combination of two or more of 11-15 above or 17-20 below, further comprising providing the second temperature sensor at the second position between 20° to 25° from the origin 0° within the regeneration zone.

17. The method according to any one or a combination of two or more of 11-16 above or 18-20 below, further comprising providing the first temperature sensor at the first position in the drying zone within the pressure vessel, and providing the second temperature sensor at the second position in the drying zone within the pressure vessel.

18. The method according to any one or a combination of two or more of 11-17 above or 19-20 below, wherein determining whether the rotor is stopped is based on the received first and second temperature data.

19. The method according to any one or a combination of two or more of 11-18 above or 20 below, wherein determining the rotational status of the rotor is based only on the received first and second signals.

20. The method according to any one or a combination of two or more of 11-19 above, wherein the compressed-gas source is a compressor, and the regeneration gas source is a portion of a stream of a compressed gas output by the compressor.

21. A hardware storage device having stored thereon computer executable instructions which, when executed by one or more processors of a computing system, configure the computing system to perform the method of any one or a combination of two or more of 11-20 above.

22. A compressed-gas dryer system comprising:
  a compressed gas inlet configured to receive a compressed gas to be dried from a compressed gas source;
  a regeneration gas inlet configured to receive a regeneration gas from a regeneration gas source;
  a pressure vessel defining a drying zone and a regeneration zone,
    the drying zone having the inlet through which the compressed gas to be dried is received into the drying zone and an outlet through which dried compressed gas exits the drying zone, and
    the regeneration zone having the inlet through which the regeneration gas is received into the regeneration zone and an outlet through which the regeneration gas exits the regeneration zone;
  a driver configured to drive rotation of a rotor provided in the pressure vessel in a predetermined rotational direction;
  a first temperature sensor configured to obtain first temperature data indicative of a first temperature at a first position within the pressure vessel; and
  a controller configured to receive the first temperature data and second temperature data and based thereon, determine a rotational status of the rotor.

23. The dryer system according to any one or a combination of two or more of 22 above or 24-33 below, further comprising a second temperature sensor configured to obtain second temperature data indicative of a second temperature at a second position within the pressure vessel.

24. The dryer system according to any one or a combination of two or more of 22-23 above or 25-33 below, wherein the first temperature sensor is arranged at the first position in the regeneration zone within the pressure vessel.

25. The dryer system according to any one or a combination of two or more of 22-24 above or 26-33 below, wherein the second temperature sensor is arranged at the second position in the regeneration zone within the pressure vessel.

26. The dryer system according to any one or a combination of two or more of 22-25 above or 27-33 below, wherein the second temperature sensor is arranged at the second position that is within a latter portion in the regeneration zone than the first temperature sensor in view of the rotation of the rotor.

27. The dryer system according to any one or a combination of two or more of 22-26 above or 28-33 below, wherein the first temperature sensor is arranged at the first position between 5° to 40° from the origin 0° within the regeneration zone, and/or the second temperature sensor is arranged at the second position between 50° to 90° from the origin 0° within the regeneration zone.

28. The dryer system according to any one or a combination of two or more of 22-27 above or 29-33 below, wherein the second temperature sensor is arranged at the second position between 85° to 90° from the origin 0° within the regeneration zone.

29. The dryer system according to any one or a combination of two or more of 22-28 above or 30-33 below, wherein the first temperature sensor is arranged at the first position between 20° to 25° from the origin 0° within the regeneration zone.

30. The dryer system according to any one or a combination of two or more of 22-29 above or 31-33 below, wherein the first temperature sensor is arranged at the first position in the drying zone within the pressure vessel, and the second temperature sensor is arranged at the second position in the drying zone within the pressure vessel.

31. The dryer system according to any one or a combination of two or more of 22-30 above or 32-33 below, wherein the controller is configured to determine whether the rotor is stopped based on the received first temperature data.

32. The dryer system according to any one or a combination of two or more of 22-31 above or 33 below, wherein the controller is configured to determine the rotational status of the rotor based only on the received first temperature data.

33. The dryer system according to any one or a combination of two or more of 22-32 above, wherein the compressed-gas source is a compressor, and the regeneration gas source is a portion of a stream of a compressed gas output by the compressor.

34. A temperature-based method for determining a rotational status of a rotor of a compressed-gas dryer system, the compressed-gas system including a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction, the method comprising:

receiving first temperature data of a first signal obtained by a first temperature sensor, the first temperature data being indicative of a first temperature at a first position within the pressure vessel; and determining, by a controller, the rotational status of the rotor based on the first temperature data obtained from the first temperature sensor.

35. The method according to any one or a combination of two or more of 34 above or 36-44 below, further comprising receiving second temperature data of a second signal obtained by a second temperature sensor, the second temperature data being indicative of a second temperature at a second position within the pressure vessel; and determining, by the controller, the rotational status of the rotor based on the first temperature data obtained from the first temperature sensor and the second temperature data obtained from the second temperatures sensor.

36. The method according to any one or a combination of two or more of 34-35 above or 37-44 below, further comprising providing the first temperature sensor at the first position at the outlet side of the regeneration zone within the pressure vessel, and/or providing the second temperature sensor at the second position at the outlet side of the regeneration zone within the pressure vessel.

37. The method according to any one or a combination of two or more of 34-36 above or 38-44 below, further comprising providing the second temperature sensor at the second position that is within a latter portion in the regeneration zone than the first temperature sensor in view of the rotation of the rotor.

38. The method according to any one or a combination of two or more of 34-37 above or 39-44 below, further comprising providing the first temperature sensor at the first position between 5° to 40° from the origin 0° within the regeneration zone, and providing the second temperature sensor at the second position between 50° to 90° from the origin 0° within the regeneration zone.

39. The method according to any one or a combination of two or more of 34-38 above or 40-44 below, further comprising providing the second temperature sensor at the second position between 85° to 90° from the origin 0° within the regeneration zone.

40. The method according to any one or a combination of two or more of 34-39 above or 41-44 below, further comprising providing the second temperature sensor at the second position between 20° to 25° from the origin 0° within the regeneration zone.

41. The method according to any one or a combination of two or more of 34-40 above or 42-44 below, further comprising providing the first temperature sensor at the first position in the drying zone within the pressure vessel, and providing the second temperature sensor at the second position in the drying zone within the pressure vessel.

42. The method according to any one or a combination of two or more of 34-41 above or 43-44 below, wherein determining whether the rotor is stopped is based on the received first and second temperature data.

43. The method according to any one or a combination of two or more of 34-42 above or 44 below, wherein determining the rotational status of the rotor is based only on the received first and second signals.

44. The method according to any one or a combination of two or more of 34-43 above, wherein the compressed-gas source is a compressor, and the regeneration gas source is a portion of a stream of a compressed gas output by the compressor.

45. A hardware storage device having stored thereon computer executable instructions which, when executed by one or more processors of a computing system, configure the computing system to perform the method of any one or a combination of two or more of 34-44 above.

46. The dryer system according to any one or a combination of two or more of 1-10 above, further comprising the compressed gas source that provides the compressed gas to be dried.

47. The dryer system according to any one or a combination of two or more of 1-10 or 46 above, further comprising the regeneration gas source that provides the regeneration gas.

48. The dryer system according to any one or a combination of two or more of 22-33 above, further comprising the compressed gas source that provides the compressed gas to be dried.

49. The dryer system according to any one or a combination of two or more of 22-33 above or 48 above, further comprising the regeneration gas source that provides the regeneration gas.

Although various example embodiments have been described in detail herein, those skilled in the art will readily appreciate in view of the present disclosure that many modifications are possible in the example embodiments without materially departing from the concepts of present disclosure. Accordingly, any such modifications are intended to be included in the scope of this disclosure. Likewise, while the disclosure herein contains many specifics, these specifics should not be construed as limiting the scope of the disclosure or of any of the appended claims, but merely as providing information pertinent to one or more specific embodiments that may fall within the scope of the disclosure and the appended claims. Any described features from the various embodiments disclosed may be employed in combination. In addition, other embodiments of the present disclosure may also be devised which lie within the scopes of the disclosure and the appended claims. Each addition, deletion, and modification to the embodiments that falls within the meaning and scope of the claims is to be embraced by the claims.

Certain embodiments and features may have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges may appear in one or more claims below. Any numerical value is "about" or "approximately" the indicated value, and takes into account experimental error and variations that would be expected by a person having ordinary skill in the art.

The invention claimed is:

1. A compressed-gas dryer system comprising:
a compressed gas inlet configured to receive a compressed gas to be dried from a compressed gas source;
a regeneration gas inlet configured to receive a regeneration gas from a regeneration gas source;
a pressure vessel defining a drying zone and a regeneration zone,
    the drying zone having an inlet through which the compressed gas to be dried is received into the drying zone and an outlet through which dried compressed gas exits the drying zone, and
    the regeneration zone having an inlet through which the regeneration gas is received into the regeneration zone and an outlet through which the regeneration gas exits the regeneration zone;
a driver configured to drive rotation of a rotor provided in the pressure vessel in a predetermined rotational direction about an axis of rotation;
a first temperature sensor configured to obtain first temperature data indicative of a first temperature at a first position within the pressure vessel; and
a controller configured to receive the first temperature data, and based thereon, determine a rotational status of the rotor,
wherein the first temperature sensor is arranged to obtain the first temperature data at the first position between 5° to 40° from a beginning at an origin 0° as a starting position within the regeneration zone.

2. The dryer system according to claim 1, further comprising a second temperature sensor configured to obtain second temperature data indicative of a second temperature at a second position within the pressure vessel.

3. The dryer system according to claim 1, wherein the first temperature sensor is arranged at the first position in the regeneration zone within the pressure vessel.

4. The dryer system according to claim 2, wherein the second temperature sensor is arranged at the second position in the regeneration zone within the pressure vessel.

5. The dryer system according to claim 2,
wherein the first temperature sensor is arranged to obtain the first temperature data at the first position within the regeneration zone, and
wherein the second temperature sensor is arranged to obtain the second temperature data at the second position that is within the regeneration zone at a more latter portion in the regeneration zone than the first position in view of the rotation of the rotor about the axis of rotation.

6. The dryer system according to claim 2, the second temperature sensor is arranged to obtain the second temperature data at the second position between 50° to 90° from the beginning at the origin 0° as the starting position within the regeneration zone.

7. The dryer system according to claim 2, wherein the second temperature sensor is arranged to obtain the second temperature data at the second position between 85° to 90° from the beginning at the origin 0° as the starting position within the regeneration zone.

8. The dryer system according to claim 2, wherein the controller is configured to determine the rotational status of the rotor based only on the received first temperature data, or wherein the controller is configured to determine the rotational status of the rotor based only on a combination of the received first temperature data and the received second temperature data.

9. The dryer system according to claim 1, wherein the compressed gas source is a compressor, and the regeneration gas source is a portion of a stream of a compressed gas output by the compressor.

10. The dryer system according to claim 1, wherein the first temperature sensor is arranged to obtain the first temperature data at the first position between 20° to 25° from the beginning at the origin 0° as the starting position within the regeneration zone.

11. A compressed-gas dryer system comprising:
a compressed gas inlet configured to receive a compressed gas to be dried from a compressed gas source;
a regeneration gas inlet configured to receive a regeneration gas from a regeneration gas source;
a pressure vessel defining a drying zone and a regeneration zone,
    the drying zone having an inlet through which the compressed gas to be dried is received into the drying zone and an outlet through which dried compressed gas exits the drying zone, and
    the regeneration zone having an inlet through which the regeneration gas is received into the regeneration zone and an outlet through which the regeneration gas exits the regeneration zone;
a driver configured to drive rotation of a rotor provided in the pressure vessel in a predetermined rotational direction about an axis of rotation;
a first temperature sensor configured to obtain first temperature data indicative of a first temperature at a first position within the pressure vessel;
a controller configured to receive the first temperature data, and based thereon, determine a rotational status of the rotor; and
a second temperature sensor configured to obtain second temperature data indicative of a second temperature at a second position within the pressure vessel, wherein the first temperature sensor is arranged to obtain the first temperature data at the first position in the drying zone within the pressure vessel, and the second temperature sensor is arranged to obtain the second temperature data at the second position in the drying zone within the pressure vessel.

12. The dryer system according to claim 11, wherein the controller is configured to determine whether the rotor is stopped based on the received first temperature data, or wherein the controller is configured to determine whether the rotor is stopped based on the received first temperature data and second temperature data.

13. A temperature-based method for determining a rotational status of a rotor of a compressed-gas dryer system, the compressed-gas system including a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction about an axis of rotation, the method comprising:

receiving first temperature data of a first signal obtained by a first temperature sensor, the first temperature data being indicative of a first temperature at a first position within the pressure vessel; and determining, by a controller, the rotational status of the rotor based on the first temperature data obtained from the first temperature sensor, wherein receiving the first temperature data includes receiving the first temperature data from the first temperature sensor that is indicative of the first temperature at the first position between 5° to 40° from a beginning at an origin 0° as a starting position within the regeneration zone.

14. The method according to claim 13, further comprising receiving second temperature data of a second signal obtained by a second temperature sensor, the second temperature data being indicative of a second temperature at a second position within the pressure vessel; and determining, by the controller, the rotational status of the rotor based on the first temperature data obtained from the first temperature sensor and the second temperature data obtained from the second temperatures sensor.

15. The method according to claim 14, further comprising providing the first temperature sensor at the first position at the outlet side of the regeneration zone within the pressure vessel, and/or providing the second temperature sensor at the second position at the outlet side of the regeneration zone within the pressure vessel.

16. The method according to claim 14, wherein receiving the first temperature data includes receiving the first temperature data from the first temperature sensor that is indicative of the first temperature at the first position within the regeneration zone, and wherein receiving the second temperature data includes receiving the second temperature data from the second temperature sensor that is indicative of the second temperature at the second position that is within the regeneration zone at a more latter portion in the regeneration zone than the first position in view of the rotation of the rotor about the axis of rotation.

17. The method according to claim 14, wherein receiving the second temperature data includes receiving the second temperature data from the second temperature sensor that is indicative of the second temperature at the second position between 50° to 90° from the beginning at the origin 0° as the starting position within the regeneration zone.

18. The method according to claim 14, further comprising wherein receiving the second temperature data includes receiving the second temperature data from the second temperature sensor that is indicative of the second temperature at the second position between 85° to 90° from a beginning at an origin 0° as a starting position within the regeneration zone.

19. The method according to claim 13, wherein receiving the first temperature data includes receiving the first temperature data from the first temperature sensor that is indicative of the first temperature at the first position between 20° to 25° from the beginning at the origin 0° as the starting position within the regeneration zone.

20. A hardware storage device having stored thereon computer executable instructions which, when executed by one or more processors of a computing system, configure the computing system to perform the method of claim 13.

21. A temperature-based method for determining a rotational status of a rotor of a compressed-gas dryer system, the compressed-gas system including a compressed-gas source that provides a compressed gas to be dried, a regeneration gas source that provides a regeneration gas, and a pressure vessel defining a drying zone and a regeneration zone, the drying zone having an inlet through which the compressed gas to be dried is received into the drying zone and an outlet through which dried compressed gas exits the drying zone, and the regeneration zone having an inlet through which the regeneration gas is received into the regeneration zone and an outlet through which the regeneration gas exits the regeneration zone, and a driver configured to drive rotation of a rotor provided in the pressure vessel in a predetermined rotational direction about an axis of rotation, the method comprising:

receiving first temperature data of a first signal obtained by a first temperature sensor, the first temperature data being indicative of a first temperature at a first position within the pressure vessel;

determining, by a controller, the rotational status of the rotor based on the first temperature data obtained from the first temperature sensor; and receiving second temperature data of a second signal obtained by a second temperature sensor, the second temperature data being indicative of a second temperature at a second position within the pressure vessel, wherein receiving the first temperature data includes receiving the first temperature data from the first temperature sensor that is indicative of the first temperature at the first position in the drying zone within the pressure vessel, and providing the second temperature sensor at the second position in the drying zone within the pressure vessel.

22. The method according to claim 21, wherein determining the rotational status of the rotor includes determining whether the rotor is stopped based on the received first temperature data or determining whether the rotor is stopped is based on a combination of the received first temperature data and the received second temperature data.

* * * * *